US010968051B1

(12) United States Patent
Tomasetta et al.

(10) Patent No.: US 10,968,051 B1
(45) Date of Patent: Apr. 6, 2021

(54) ADJUSTABLE ROBOTIC END OF ARM TOOL FOR MULTIPLE OBJECT HANDLING

(71) Applicant: Amazon Technologies, Inc., Seattle, WA (US)

(72) Inventors: Stephanie Tomasetta, Seattle, WA (US); Sean Murphy, Seattle, WA (US); Christopher Cudney, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 25 days.

(21) Appl. No.: 16/449,007

(22) Filed: Jun. 21, 2019

(51) Int. Cl.
*B65G 47/90* (2006.01)
*B66F 9/14* (2006.01)
*B25J 9/16* (2006.01)
*B65G 47/88* (2006.01)
*B25J 9/00* (2006.01)

(52) U.S. Cl.
CPC ............ *B65G 47/90* (2013.01); *B25J 9/0024* (2013.01); *B25J 9/162* (2013.01); *B65G 47/8838* (2013.01); *B66F 9/143* (2013.01)

(58) Field of Classification Search
CPC .... B66F 9/14; B66F 9/143; B66F 9/16; B66F 9/165
See application file for complete search history.

(56) References Cited

U.S. PATENT DOCUMENTS

| 3,203,568 A | * | 8/1965 | Quayle | B66F 9/12 414/621 |
| 3,223,267 A | * | 12/1965 | Stammen | B66F 9/143 414/671 |
| 5,669,750 A | * | 9/1997 | Vieselmeyer | B66F 9/065 187/237 |
| 8,777,551 B1 | * | 7/2014 | Widder | B27B 31/00 414/796.6 |
| 2007/0079558 A1 | * | 4/2007 | Foroni | B66F 9/148 49/375 |
| 2009/0116945 A1 | * | 5/2009 | White | B66F 9/12 414/667 |
| 2013/0084154 A1 | * | 4/2013 | Sharp | B66F 9/142 414/667 |

* cited by examiner

*Primary Examiner* — Gerald McClain
(74) *Attorney, Agent, or Firm* — Athorus, PLLC

(57) ABSTRACT

Systems and methods to manipulate objects may include an adjustable robotic end of arm tool including a pair of static forks or arms and a pair of movable forks or arms. The static forks may be configured to lift objects, such as pallets, totes, or bins. The movable forks may be configured to move between a plurality of positions, including a storage position and a lifting position. When in the lifting position, the movable forks may also be configured to lift objects, such as pallets, totes, or bins, such that the adjustable robotic end of arm tool may simultaneously or concurrently lift and manipulate multiple objects using the static forks and the movable forks, thereby improving speed and efficiency of operations or processes utilizing the adjustable robotic end of arm tool.

20 Claims, 15 Drawing Sheets

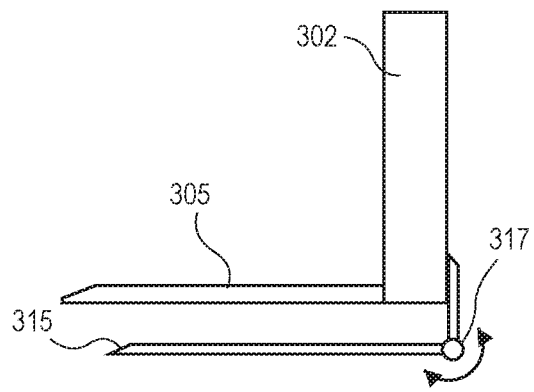
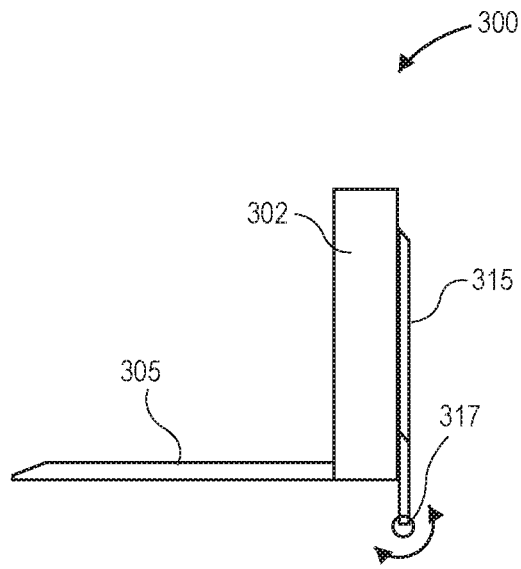
FIG. 3A    FIG. 3B
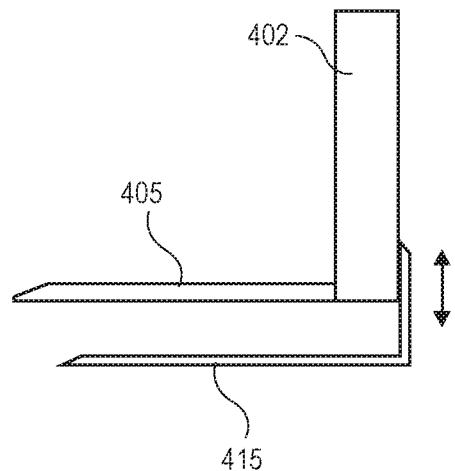
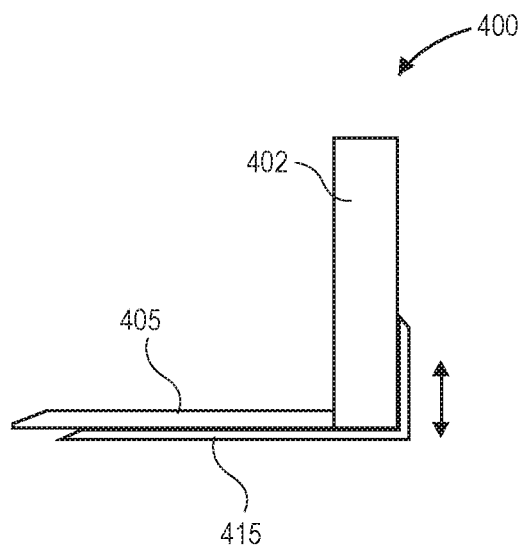
FIG. 4A    FIG. 4B

ADJUSTABLE ROBOTIC END OF ARM TOOL FOR MULTIPLE OBJECT HANDLING

BACKGROUND

Many companies may store, package, and ship items and/or groups of items from material handling facilities. For example, many companies may store items in a material handling facility and ship items to various destinations (e.g., customers, stores) from the material handling facility. Various material handling processes, including receipt, sorting, storage, shipping, or other processing of items within a material handling facility, often incur significant cost and time. Accordingly, there is a need for automated systems and methods to facilitate the various material handling processes within a material handling facility, thereby improving the speed and efficiency of such processes.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 3A is a side schematic diagram of another example end of arm tool with movable forks in a lifting position, and FIG. 3B is a side schematic diagram of the example end of arm tool of FIG. 3A with movable forks in a storage position, in accordance with disclosed implementations.

FIG. 4A is a side schematic diagram of yet another example end of arm tool with movable forks in a lifting position, and FIG. 4B is a side schematic diagram of the example end of arm tool of FIG. 4A with movable forks in a storage position, in accordance with disclosed implementations.

Figure 1:
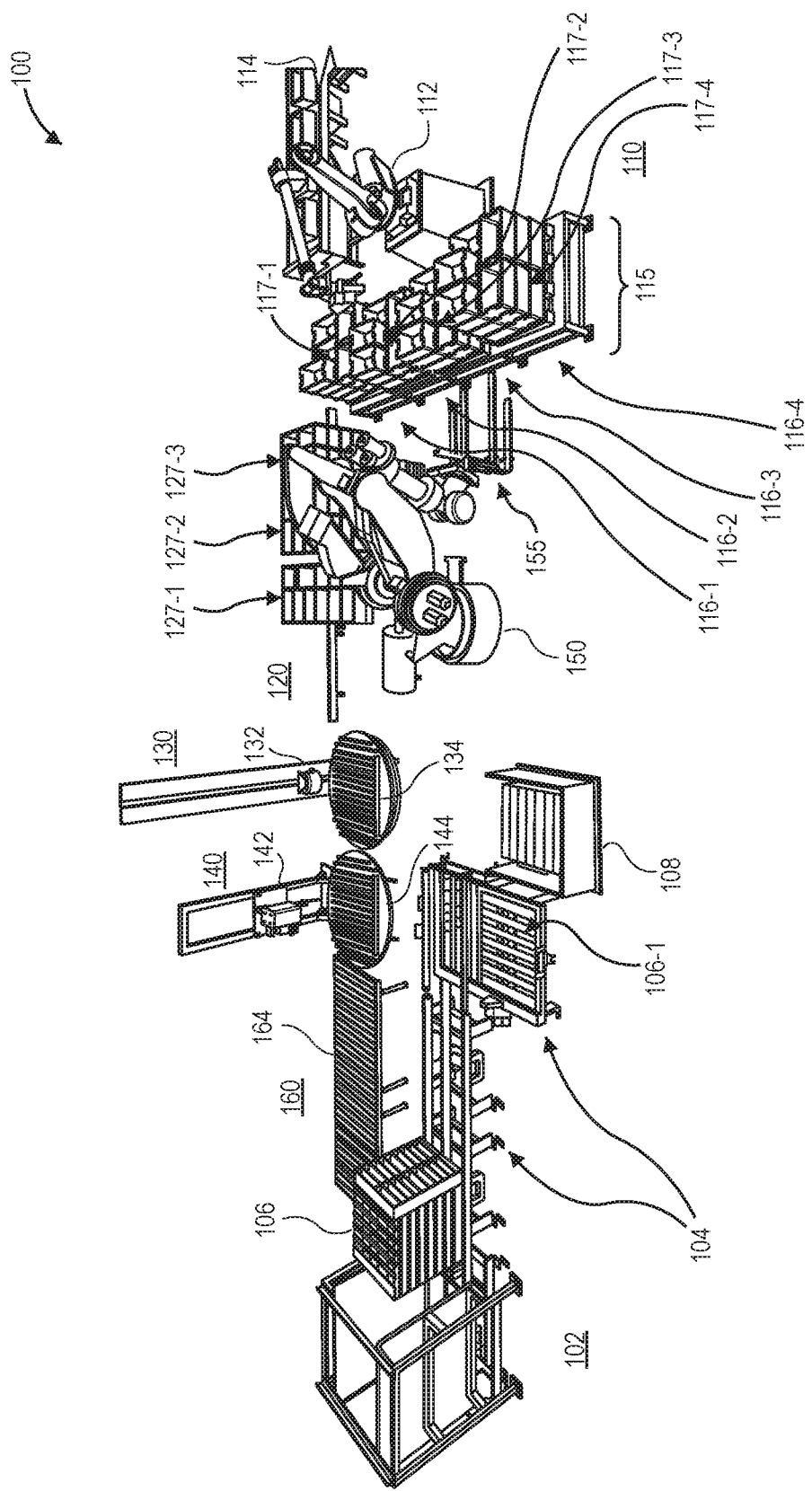
FIG. 1 is a schematic diagram of an example palletizing system, in accordance with disclosed implementations.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Systems and methods described herein relate to example end of arm tools that may be used for lifting, placing, moving, replenishing, or otherwise manipulating one or more objects within a facility, building, or warehouse.

In example embodiments, an end of arm tool may be coupled to a robotic arm, other robotic manipulator, industrial truck or vehicle, or other machinery or equipment. The end of arm tool may be configured to lift, place, move, replenish, or otherwise manipulate one or more objects, such as pallets, within a facility. In other example embodiments, the one or more objects to be manipulated by the end of arm tool may include various other types, sizes, and/or shapes of objects, such as totes, bins, cases, or other containers. Further, the end of arm tool may also be used in various other environments, e.g., an outdoor area, an open air facility, a storage or freight container, or other indoor or outdoor environments.

An example end of arm tool may include a first pair or first set of forks or arms that may be substantially static, stationary, or fixed. The first pair of forks may be configured to lift, place, move, replenish, or otherwise manipulate one or more pallets within a facility. In addition, the example end of arm tool may also include a second pair or second set of forks or arms that may be movable, adjustable, pivotable, rotatable, slidable, extendable, and/or retractable. The second pair of forks may move between various positions, including a storage or non-use position and a lifting or use position. In the lifting position, the second pair of forks may also be configured to lift, place, move, replenish, or otherwise manipulate one or more pallets within a facility. In the storage position, the second pair of forks may be stowed, hidden, and/or retracted so as not to interfere with operations or processes utilizing the first pair of forks.

Further, the example end of arm tools described herein may include and/or communicate with one or more control systems and various sensors to control operations or processes utilizing the end of arm tools. For example, the various sensors may include photoelectric sensors, photo eyes, or proximity sensors to detect the presence or absence of objects lifted, moved, or placed by the first and second pairs of forks. In addition, the various sensors may also include imaging sensors, barcode scanners, or RFID (radiofrequency identification) readers to identify objects lifted, moved, or placed by the first and second pairs of forks. Based at least in part on data received from the various sensors, a control system may instruct various operations or processes utilizing an end of arm tool, such as movement of the second pair of forks between the storage position and the lifting position, movement of objects lifted by the first pair or second pair of forks between various locations, and various other manipulations of objects by the first pair or second pair of forks.

The example end of arm tools described herein may improve and facilitate various operations or processes related to manipulation of objects, by enabling simultaneous and/or concurrent manipulation of multiple pallets or other objects using multiple sets of forks on the end of arm tools, while also allowing manipulation of a single pallet or object using a single set of forks of the end of arm tools by stowing, hiding, or retracting other sets of movable forks. For example, the example end of arm tools described herein may significantly reduce cycle times associated with manipulation of objects in comparison with conventional end of arm tools having only a single pair of static or fixed forks. Moreover, the example end of arm tools described herein may also reduce cycle times, e.g., approximately 10-20% reduction in cycle times, associated with manipulation of objects in comparison with conventional end of arm tools having two offset or angled pairs of static or fixed forks, e.g., pairs of static forks angled 90 degrees relative to each other. Furthermore, the example end of arm tools described herein may occupy or require a smaller footprint or area for manipulation in comparison with conventional end of arm tools having two offset or angled pairs of static or fixed forks, thereby improving efficiency, speed, and safety associated with various operations or processes related to manipulation of objects.

FIG. 1 is a schematic diagram of an example palletizing system 100, in accordance with disclosed implementations.

The example palletizing system 100 may include a pallet replenishment station 102, a pallet loading station 110, a pallet buffer station 120, a pallet wrapping station 130, a pallet labeling station 140, a robotic arm or manipulator 150, and a pallet transport station 160, which may transport pallets to various downstream stations and processes. The example palletizing system 100 is configured substantially around the robotic arm 150, so that the robotic arm 150 can perform the various transitions, movements, and other manipulations of pallets within the palletizing system 100. In other example embodiments, the palletizing system 100 may include various other stations or processes, and/or may not include some of the stations or processes shown in the example palletizing system 100 of FIG. 1. In further example embodiments, various stations or processes may also utilize other robotic arms or manipulators, agents or associates, or other combinations of automated, robotic, and manual operations. The various stations or processes of the example palletizing system 100 may he in communication with a control system, as described in further detail with respect to FIG. 12, that may receive data from and/or send or transmit commands and/or instructions to any of the various components, manipulators, or portions of the various stations or processes.

The example pallet replenishment station 102 may include one or more conveyors 104 that are configured to supply and/or move empty pallets 106 for the palletizing system 100, As shown in FIG. 1, a stack of empty pallets 106 may be provided from various upstream stations or processes to the palletizing system 100. The stack of empty pallets 106 may move and/or pause or wait along one or more portions of a conveyor 104 until an empty pallet is requested by other stations or processes of the palletizing system 100.

In some example embodiments, an empty pallet 106-1 may be singulated or separated from a stack of empty pallets by lifting, using the robotic arm 150, the stack of empty pallets except for a bottom-most empty pallet 106-1. The bottom-most empty pallet 106-1 may then move along a portion of a conveyor 104 to a different or new position, as shown in FIG. 1, and the remaining stack of empty pallets may again be lowered onto a portion of the conveyor 104 from which the empty pallet 106-1 was just moved or singulated. The different or new position of the empty pallet 106-1 may comprise a pallet check or verification station that may check dimensions, structure, or other aspects of the empty pallet 106-1 to determine whether the empty pallet 106-1 is acceptable for use by the palletizing system 100. The pallet check station may include various sensors to check aspects of the empty pallet 106-1, such as photoelectric sensors, photoeyes, proximity sensors, imaging sensors, weight sensors, or other types of sensors.

Figure 10:
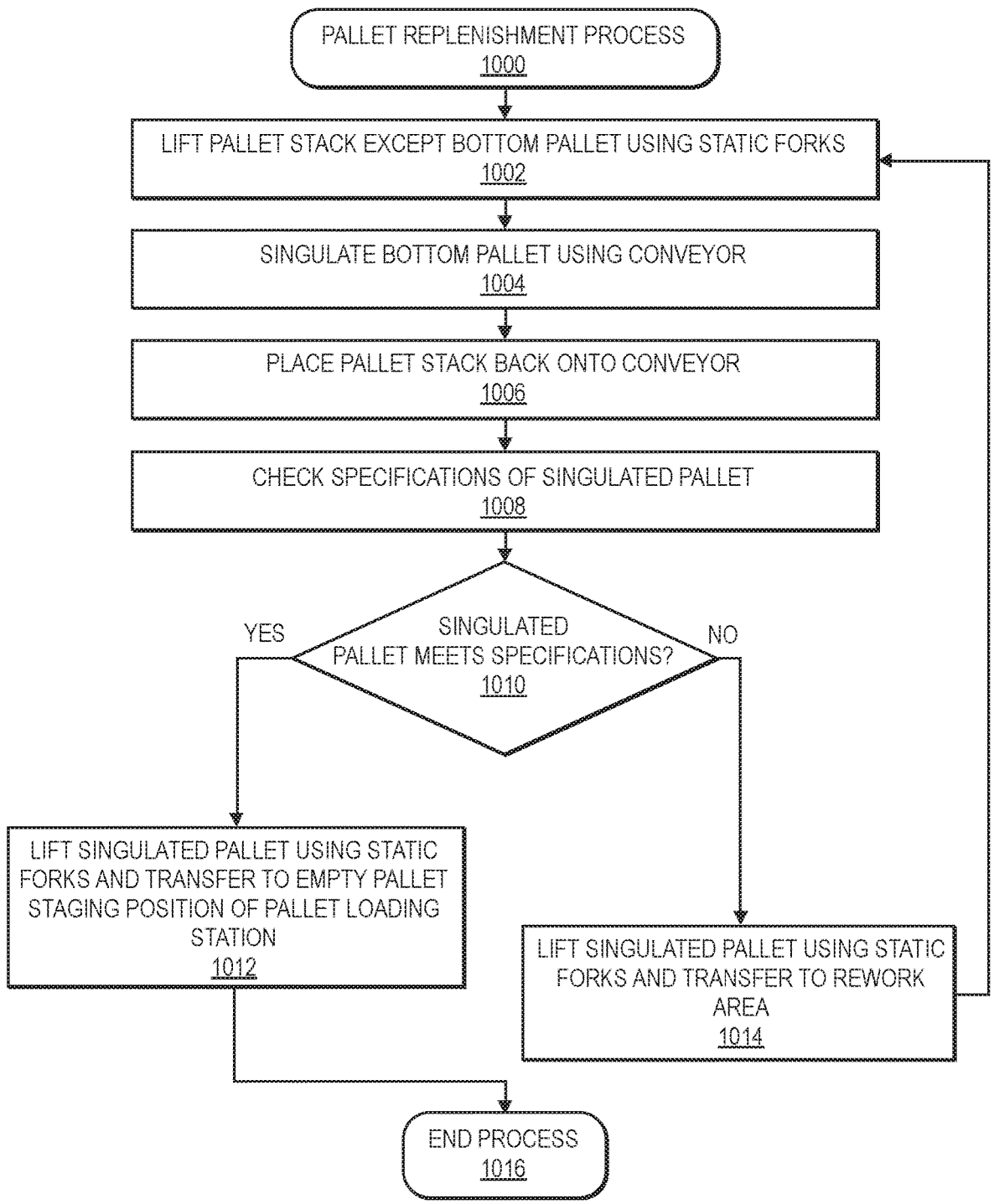
FIG. 10 is a flow diagram illustrating an example pallet replenishment process, in accordance with disclosed implementations.

If the pallet check station determines that the empty pallet 106-1 is not acceptable for use by the palletizing system 100, then the empty pallet 106-1 may be moved to a rework or reject area 108, e.g., by a conveyor, by the robotic arm 150, or by an agent or associate. if the pallet check station, however, determines that the empty pallet 106-1 is acceptable for use by the palletizing system 100, then the robotic arm 150 may lift, move, and place the empty pallet 106-1 from the pallet replenishment station 102 when requested or instructed by the palletizing system 100, e.g., when requested or needed by the pallet loading station 110 Various operations and processes related to the pallet replenishment station are described in further detail with respect to FIG. 10.

The example pallet loading station 110 may include a loading manipulator 112, one or more conveyors 114, and a pallet loading area 115 that may include a plurality of empty pallet staging positions 116 and a plurality of pallet loading positions 117.

The loading manipulator 112 may comprise a robotic arm or manipulator having an associated end effector to pick and place objects onto pallets. For example, the loading manipulator 112 may pick up objects, e.g., totes, bins, cases, or containers, from a portion of a conveyor 114, and may place the objects onto one or more pallets located at a plurality of pallet loading positions 117, or on top of other objects previously placed onto one or more pallets located at a plurality of pallet loading positions 117. The loading manipulator 112 may include various types of end effectors, such as grasping, vacuum- or suction-based, scooping, magnetic, or other types of end effectors. In addition, the objects that may be picked and placed onto one or more pallets by the loading manipulator 112 may include various other types of objects, including boxes, packaged products, unpackaged products, individual items, or other types of objects.

The pallet loading area 115 may comprise shelves, racks, platforms, or other physical structures that may include at least two levels, such as a first, lower level having a plurality of empty pallet staging positions 116-1, 116-2, 116-3, 116-4 and a second, upper level having a plurality of pallet loading positions 117-1, 117-2, 117-3, 117-4. The empty pallet staging positions 116 and the pallet loading positions 117 may be substantially vertically aligned, such that each empty pallet staging position 116 is substantially directly below a corresponding pallet loading position 117. Each of the empty pallet staging positions 116 may be configured to receive an empty pallet, such as empty pallet 106-1. In addition, each of the pallet loading positions 117 may be configured to initially receive an empty pallet and to also receive one or more objects placed onto the pallet.

Although FIG. 1 shows a particular number, configuration, and arrangement of the pallet loading area 115, empty pallet staging positions 116, and pallet loading positions 117, the example pallet loading station 110 may include various other numbers, configurations, and arrangements of pallet loading areas, empty pallet staging positions, and pallet loading positions. For example, fewer or more than four empty pallet staging positions and four pallet loading positions may be included in the pallet loading area. In addition, the pallet loading area may have different sizes or shapes, e.g., curved, angled, or other sizes or shapes, than the straight, rectangular shape shown in FIG. 1. Further, multiple pallet loading areas may be included, as well as multiple loading manipulators and conveyors to load objects onto pallets associated with the multiple pallet loading areas.

The example pallet buffer station 120 may include a plurality of pallet buffer positions 127. The pallet buffer positions 127 may comprise storage or waiting areas or positions in which pallets that are fully or at least partially loaded with objects may be placed temporarily. The at least partially loaded pallets may move to the pallet buffer positions 127 from the pallet loading station 110, e.g., via the robotic arm 150, and the at least partially loaded pallets may move from the pallet buffer positions 127 to various other stations or processes, such as the pallet loading station 110, the pallet wrapping station 130, the pallet labeling station 140, and/or the pallet transport station 160, e.g., via the robotic arm 150, via a conveyor, via other robotic or automated systems, or via agents or associates. Although FIG. 1 shows a particular number, configuration, and arrangement of pallet buffer positions 127-1, 127-2, 127-3, the pallet buffer station 120 may include various other numbers, configurations, or arrangements of pallet buffer positions.

The example pallet wrapping station 130 may include a wrapping machine 132, and a rotatable conveyor 134. The wrapping machine 132 may apply various types of materials around a pallet, such as plastic, paper, shrinkwrap materials, or others. Upon receipt of an at least partially loaded pallet to be wrapped at the pallet wrapping station 130, the rotatable conveyor 134 may rotate the pallet, and the wrapping machine 132 may apply wrapping materials around a periphery of the pallet. During rotation of the pallet by the rotatable conveyor 134, the wrapping machine 132 may gradually move vertically upwards and/or downwards with respect to the pallet while dispensing wrapping material, thereby wrapping substantially an entire periphery of the pallet. In some example embodiments, the pallet wrapping station 130 may receive two or more stacked pallets loaded with objects that are to be wrapped together. Upon completion of wrapping of a pallet, or multiple stacked pallets, the rotatable conveyor 134 may stop rotation of the wrapped pallet, and the rotatable conveyor 134 may cause the wrapped pallet to move to a downstream station, e.g., the pallet labeling station 140.

The example pallet labeling station 140 may include a labeling machine 142, and a rotatable conveyor 144. The label machine 142 may apply various types of labels on one or more surfaces of a wrapped pallet, such as shipping labels, product labels, warning labels, or others. Upon receipt of a wrapped pallet, or multiple stacked pallets, at the pallet labeling station 140, the rotatable conveyor 144 may rotate the pallet to different rotational positions, and the labeling machine 142 may apply one or more labels to one or more surfaces of the wrapped pallet. The labeling machine 142 may also move vertically with respect to the wrapped pallet to apply one or more labels to one or more surfaces at different heights or positions of the wrapped pallet. Upon completion of labeling of a wrapped pallet, or multiple stacked pallets, the rotatable conveyor 144 may stop rotation of the labeled, wrapped pallet, and the rotatable conveyor 144 may cause the labeled, wrapped pallet to move to a downstream station, e.g., the pallet transport station 160, The example pallet transport station 160 may include one or more conveyors 164 or other material handling equipment. Upon receipt at the pallet transport station 160 of a pallet, or multiple stacked pallets, that may be wrapped and/or labeled, the one or more conveyors 164 may transport the pallet to various downstream stations or processes, such as pallet verification stations, weight check stations, buffer stations, sorting systems or processes, shipping systems or processes, or other stations, systems, or processes.

The example robotic arm or manipulator 150 may comprise a six-axis robotic arm or manipulator, or other types of robotic arms or manipulators, such as cylindrical, spherical, polar, articulated, cartesian, or other types. The robotic arm 150 may include an example end of arm tool 155, as further described herein at least with respect to FIGS. 2A-2D, that may enable lifting, placing, moving, replenishing, or otherwise manipulating one or more objects, e.g., pallets, totes, bins, cases, or other containers.

In example embodiments, the robotic arm 150 and end of arm tool 155 may facilitate singulation of empty pallets 106 and may retrieve an empty pallet 106-1 from the pallet replenishment station 102. In addition, the robotic arm 150 and end of arm tool 155 may place an empty pallet at an empty pallet staging position 116 of the pallet loading area 115 of the pallet loading station 110. Further, the robotic arm 150 and end of arm tool 155 may simultaneously or concurrently remove an at least partially loaded pallet and an empty pallet from a pallet loading position 117 and an empty pallet staging position 116, respectively. Then, the robotic arm 150 and end of arm tool 155 may place an empty pallet, e.g., the empty pallet previously removed from the empty pallet staging position 116, at a pallet loading position 117, e.g., the pallet loading position 117 from which the at least partially loaded pal let was previously removed. The robotic arm 150 and end of arm tool 155 may then move the at least partially loaded pallet to a downstream station or process, such as the pallet buffer station 120, the pallet wrapping station 130, the pallet labeling station 140, and/or the pallet transport station 160.

Various other operations or processes may also be performed by the robotic arm 150 and end of arm tool 155. For example, the robotic arm 150 and end of arm tool 155 may move at least partially loaded pallets between the pallet loading area 115 of the pallet loading station 110 and the pallet buffer station 120. In addition, the robotic arm 150 and end of arm tool 155 may move empty pallets, empty stacks of pallets and/or stacked pallets that require rework between the pallet replenishment station 102, the pallet buffer station 120, the pallet wrapping station 130, the pallet labeling station 140, and/or the pallet transport station 160.

Figure 2B:
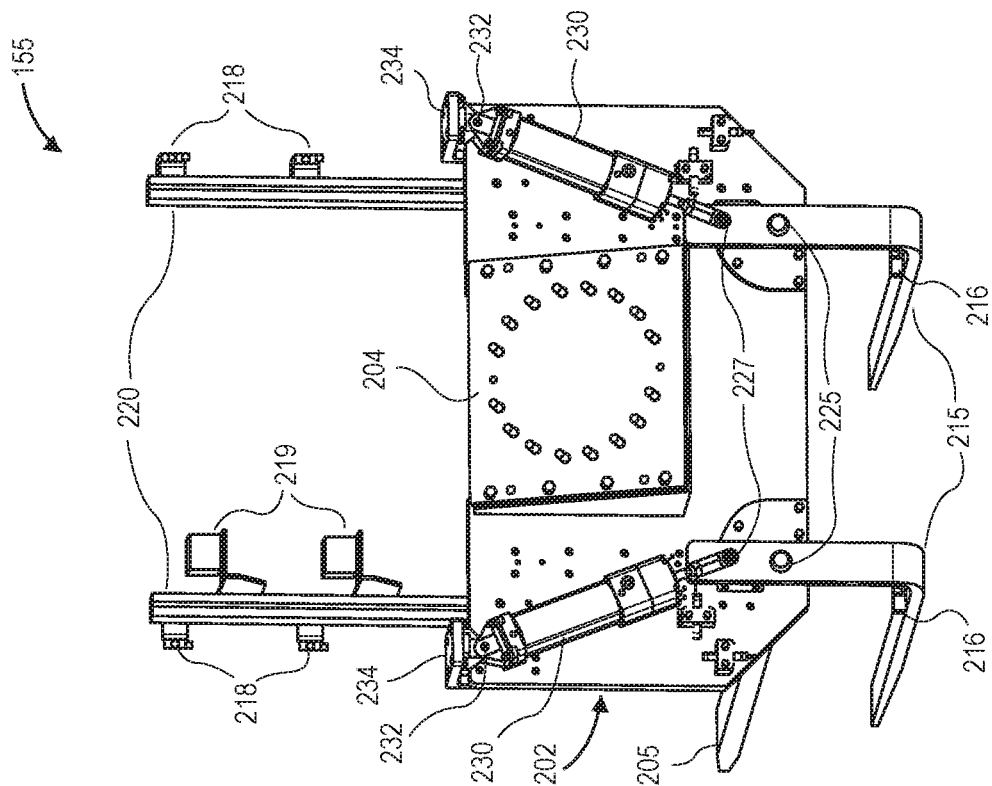
FIGS. 2A and 2B are front and rear perspective schematic diagrams, respectively, of an example end of arm tool with movable forks in a lifting position, in accordance with disclosed implementations.
Figure 2A:
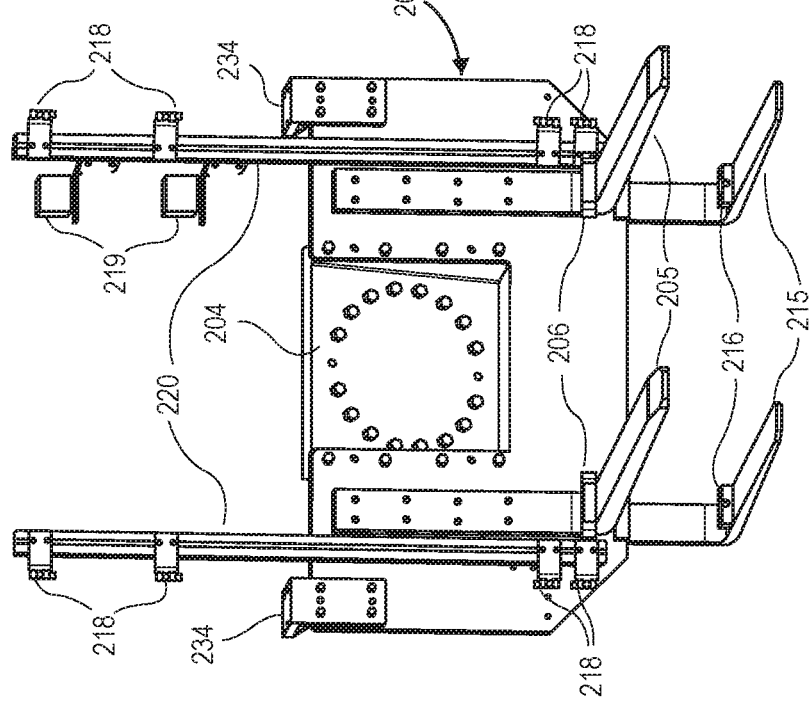

FIGS. 2A and 2B are front and rear perspective schematic diagrams, respectively, of an example end of arm tool 155 with movable forks in a lifting position, in accordance with disclosed implementations.

The example end of arm tool 155 may include a mounting plate 202, a pair or set of static forks 205, a pair or set of movable forks 215, a plurality of photoelectric sensors, photoeyes, or proximity sensors 206, 216, 218, and a plurality of imaging sensors, barcode scanners, or RFID readers 219.

The mounting plate 202 may form a base or structure to which various components of the end of arm tool 155 may be coupled or connected. For example, the mounting plate 202 may comprise a plate, surface, disk, or other structure to which various components or elements of the example end of arm tool 155 may be coupled, either directly or indirectly, and the mounting plate 202 may also comprise one or more portions, sections, or pieces that are joined together to form the mounting plate 202. In addition, the mounting plate 202 may be formed of various materials, such as metals, plastics, composites, or combinations thereof. Further, a portion of the mounting plate 202 may comprise a coupling joint 204 to which a robotic arm or manipulator, such as the robotic arm 150 shown in FIG. 1, may couple or connect to the mounting plate 202. The coupling joint 204 may comprise various types of holes, bolts, screws, nuts, or other types of fasteners to couple the mounting plate 202 of the example end of arm tool 155 to a robotic arm. In example embodiments, the coupling joint 204 may be integrally formed with the mounting plate 202, or the coupling joint 204 may be a separate component that is coupled or connected to the mounting plate 202, e.g., via various types of fasteners, welds, adhesives, or other connections. Furthermore, the coupling joint 204 may form a plane that is offset or angled with respect to a plane of a remainder of the mounting plate 202, which offset or angle may constrain movement of one or more joints of the robotic arm, e.g., to avoid singularities with respect to control and movement of the robotic arm.

The pair or set of static forks 205 may couple or connect to the mounting plate 202, e.g., via fasteners, welds, adhesives, or other connections. The pair of static forks 205 may be formed of various materials, such as metals, plastics, composites, or combinations thereof. In addition, the pair of static forks 205 may be substantially stationary, static, or fixed relative to the mounting plate 202. The pair of static forks 205 may extend from a front face of the mounting plate 202, and may be configured to lift various types of objects, such as pallets, totes, bins, cases, or other containers.

The pair or set of movable forks 215 may couple or connect to the mounting plate 202 via pivotable joints 225 or pivot points. The pair of movable forks 215 may be formed of various materials, such as metals, plastics, composites, or combinations thereof. In addition, the pivotable joints 225 may comprise pins, rods, bearings, or other pivotable or rotatable joints that are associated with a rear face of the mounting plate 202 and that enable the pair of movable forks 215 to rotate or pivot relative to the mounting plate 202. The pair of movable forks 215 may rotate or pivot between a plurality of positions, including a lifting or use position and a storage or non-use position. In the lifting position of the pair of movable forks 215 as shown in FIGS. 2A and 2B, the pair of movable forks 215 may extend from a front face of the mounting plate 202 and below the pair of static forks 205, e.g., at a defined distance below the static forks 205, and may be configured to lift various types of objects, such as pallets, totes, bins, cases, or other containers. In example embodiments in which the pair of movable forks 215 may be configured or expected to lift objects of relatively lighter weight and/or smaller size than the pair of static forks 205, the pair of movable forks 215 may be relatively shorter, thinner, and/or lighter than the pair of static forks 205.

The pair of movable forks 215 may also comprise actuators 230 configured to rotate or pivot the pair of movable forks 215 between a plurality of positions. The actuators 230 may be coupled to a rear face of the mounting plate 202, and may comprise pneumatic actuators, hydraulic actuators, linear actuators, rotary actuators, electric actuators, solenoids, or other types of actuators. In example embodiments, the actuators 230 may comprise pneumatic actuators that are configured to mechanically lock at one or more of various positions, e.g., a retracted position and/or an extended position. Further, the actuators 230 may comprise switches, toggles, encoders, or other sensing elements or devices that may detect or monitor actuated positions of the actuators 230, e.g., an extended position, a retracted position, or one or more actuated positions therebetween for pneumatic, hydraulic, or other linear actuators, or rotary positions of motors, servos, or other rotary actuators. Based on data received from one or more sensing elements of the actuators 230, positions of the pair of movable forks 215 that are actuated by actuators 230 may be determined. As shown in FIG. 2B, the actuators 230 may comprise pneumatic actuators that are connected at first ends 227 to portions of the pair of movable forks 215 and connected at second ends 232 to brackets or reinforcements 234 coupled to the mounting plate 202. The connections at the first ends 227 and the second ends 232 of the actuators 230 may comprise pins, rods, bearings, or other pivotable or rotatable joints that enable at least partial pivoting or rotation between the actuators 230 and the portions of the pair of movable forks 215 or the brackets 234 during extension or retraction of the actuators 230. In addition, the brackets 234 may be formed of various materials, such as metals, plastics, composites, or combinations thereof, and may couple or connect to the mounting plate 202, e.g., via fasteners, welds, adhesives, or other connections. As shown in FIG. 2B, the actuators 230 are shown in a retracted position, such that the pair of movable forks 215 are positioned in the lifting position via rotation around pivotable joints 225.

The plurality of photoelectric sensors, photoeyes, or proximity sensors 206, 216, 218 may be configured to detect the presence or absence of one or more objects that are lifted by the pair of static forks 205 and/or the pair of movable forks 215. The photoelectric sensors 206, 216, 218 may detect objects within a particular range, e.g., a read range of approximately 4 inches, approximately 6 inches, approximately 8 inches, or other distances, of the sensors, thereby indicating either presence of an object within the read range of the sensor or absence of an object within the read range of the sensor. Based on data received from the various photoelectric sensors 206, 216, 218, various operations and processes performed by the end of arm tool 155 may be commanded, instructed, checked, or verified, e.g., proper lifting of an object by the pair of static forks 205 and/or the pair of movable forks 215, proper placement of an object by the pair of static forks 205 and/or the pair of movable forks 215, proper movement of an object by the pair of static forks 205 and/or the pair of movable forks 215, and/or proper actuation of the pair of movable forks 215 between a lifting position and a storage position.

For example, photoelectric sensors 206 may be coupled or associated with the pair of static forks 205, and detect the presence or absence of one or more objects, e.g., pallets, totes, bins, cases, or other containers, lifted by the pair of static forks 205. likewise, photoelectric sensors 216 may be coupled or associated with the pair of movable forks 215, and detect the presence or absence of one or more objects, e.g., pallets, totes, bins, cases, or other containers, lifted by the pair of movable forks 215. In addition, photoelectric sensors 218 may be coupled or associated with the mounting plate 202 and/or rails 220 connected to the mounting plate 202. The rails 220 may be connected to the mounting plate 202 via fasteners, welds, adhesives, or other connections, and the rails 220 may be formed of various materials, such as metals, plastics, composites, or combinations thereof. In example embodiments, the photoelectric sensors 218 may be positioned and spaced along the mounting plate 202 and/or the rails 220 to detect the presence or absence of one or more stacked objects that may be lifted by the pair of static forks 205. For example, the lower pairs of photoelectric sensors 218 may be positioned to detect the presence or absence of a first or lowest layer or level of stacked objects lifted by the pair of static forks 205, the middle or intermediate pairs of photoelectric sensors 218 may be positioned to detect the presence or absence of a fourth or intermediate layer or level of stacked objects lifted by the pair of static forks 205, and the upper pairs of photoelectric sensors 218 may be positioned to detect the presence or absence of a fifth or highest layer or level of stacked objects lifted by the pair of static forks 205.

The plurality of imaging sensors, barcode scanners, or RFID readers 219 may also be coupled or associated with the mounting plate 202 and/or the rails 220 connected to the mounting plate 202. In example embodiments, the imaging sensors 219 may be positioned and spaced along the mounting plate 202 and/or the rails 220 to identify one or more stacked objects that may be lifted by the pair of static forks 205. For example, a lower imaging sensor 219 may be positioned to identify one or more first or lower stacked objects lifted by the pair of static forks 205, and an upper imaging sensor 219 may be positioned to identify one or more second or upper stacked objects lifted by the pair of static forks 205.

Based on data received from the various imaging sensors, barcode scanners, or RFID readers 219, various operations and processes performed by the end of arm tool 155 may be commanded, instructed, checked, or verified, e.g., lifting of correct or expected object(s) from correct or expected position(s) by the pair of static forks 205 and/or the pair of movable forks 215, placement of correct or expected object(s) at correct or expected position(s) by the pair of static forks 205 and/or the pair of movable forks 215, and/or movement of correct or expected object(s) between correct or expected position(s) by the pair of static forks 205 and/or the pair of movable forks 215.

Figure 2D:
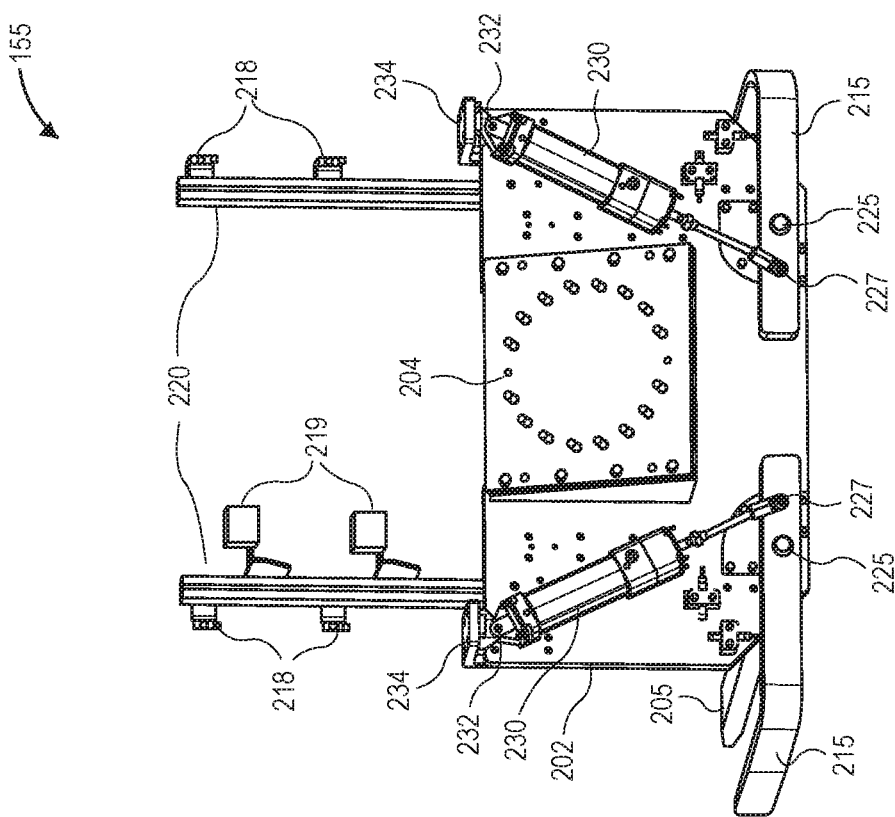
FIGS. 2C and 2D are front and rear perspective schematic diagrams, respectively, of an example end of arm tool with movable forks in a storage position, in accordance with disclosed implementations.
Figure 2C:
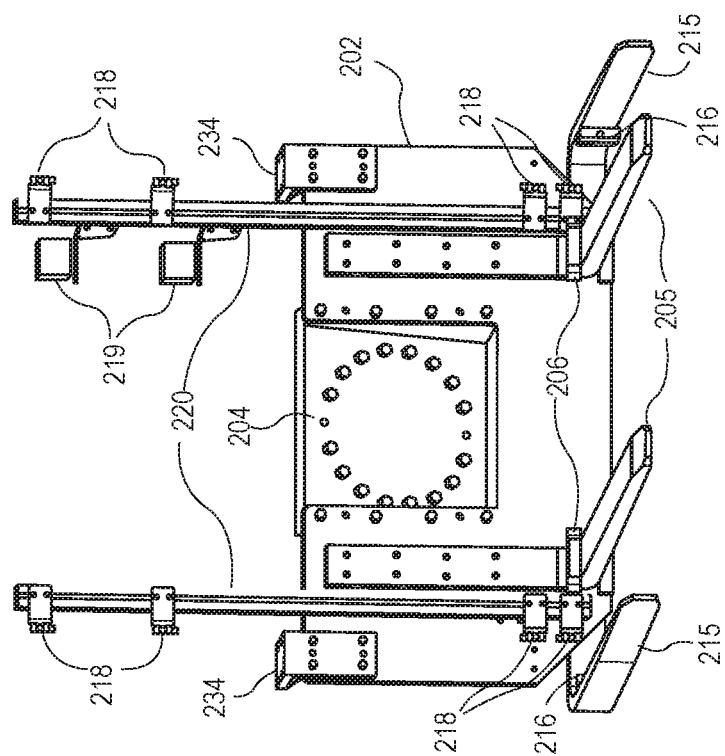

FIGS. 2C and 2D are front and rear perspective schematic diagrams, respectively, of an example end of arm tool 155 with movable forks in a storage position, in accordance with disclosed implementations. The various features illustrated in FIGS. 2C and 2D are analogous to the various features illustrated and described with respect to FIGS. 2A and 2B, in which the example end of arm tool 155 may include a mounting plate 202, a pair or set of static forks 205, a pair or set of movable forks 215, a plurality of photoelectric sensors, photoeyes, or proximity sensors 206, 216, 218, and a plurality of imaging sensors, barcode scanners, or RFID readers 219.

As shown in FIGS. 2C and 2D, the pair of static forks 205 may remain substantially stationary, static, or fixed relative to the mounting plate 202. The pair of static forks 205 may extend from a front face of the mounting plate 202, and may be configured to lift various types of objects, such as pallets, totes, bins, cases, or other containers.

In addition, the pair of movable forks 215 may rotate or pivot around pivotable joints 225 associated with a rear face of the mounting plate 202 between a plurality of positions, including a lifting or use position and a storage or non-use position. In contrast to FIGS. 2A and 2B that show the pair of movable forks 215 in the lifting position extending from a front face of the mounting plate 202, FIGS. 2C and 2D show the pair of movable forks 215 in the storage position and extending from a front face of the mounting plate 202. Each of the pair of movable forks 215 may rotate outboard of the pair of static forks 205 around respective pivotable joints 225 to the storage position.

In order to effect the rotation or pivoting of the pair of movable forks 215, the actuators 230 may move from the retracted position to an extended position to move the pair of movable forks 215 from the lifting position to the storage position, and vice versa. Due to the connections at second ends 232 of the actuators 230 to brackets 234 and the connections at first ends 227 of the actuators 230 to portions of the movable forks 215, the movable forks 215 may rotate or pivot around pivotable joints 225 responsive to retraction or extension of the actuators 230. In addition, the connections at the first ends 227 and the second ends 232 may be at least partially pivotable or rotatable to enable movement between the retracted position of the actuators 230 (and corresponding lifting position of the pair of movable forks 215) shown in FIGS. 2A and 2B, and the extended position of the actuators 230 (and corresponding storage position of the pair of movable forks 215) shown in FIGS. 2C and 2D.

Although FIGS. 2A-2D show a particular configuration and arrangement of various components or portions of the example end of arm tool 155, various other configurations and arrangements of components or portions of the example end of arm tool 155 are possible. For example, the mounting plate 202 may have a different size or shape, and/or the coupling joint 204 may have a different size or shape and/or may be positioned at a different angle relative to the mounting plate 202. In addition, various components may be integrally formed with (or separately formed from) the mounting plate 202, such as the coupling joint 204, the pair of static forks 205, the rails 220, and/or the brackets 234. Further, the actuators 230 and associated connections at first ends 227 and second ends 232 may be configured differently, e.g., positioned on a front face of the mounting plate 202, coupled inboard of the pair of static forks 205, coupled outboard of the pair of static forks 205, and/or having first ends 227 coupled to different portions of the pair of movable forks 215 relative to pivotable joints 225 (e.g., inboard or outboard of the pivotable joints 225). Moreover, in other example embodiments, the pair of movable forks 215 may utilize a single, common actuator 230, instead of separate respective actuators 230, that is configured to cause rotation or pivoting of each of the pair of movable forks 215 together between the lifting position and the storage position. In further example embodiments, the pair of movable forks 215 may include a linkage, cable, gears, or other mechanical connection therebetween, and an actuator 230 associated with and configured to move one of the pair of movable forks 215 may cause corresponding movement of the other of the pair of movable forks 215 via the linkage or other mechanical connection between the pair of movable forks 215.

FIG. 3A is a side schematic diagram of another example end of arm tool 300 with movable forks in a lifting position, and FIG. 3B is a side schematic diagram of the example end of arm tool 300 of FIG. 3A with movable forks in a storage position, in accordance with disclosed implementations.

As shown in FIGS. 3A and 3B, the example end of arm tool 300 may include a mounting plate 302 and a pair of static forks 305 coupled to and extending from a front face of the mounting plate 302. In addition, the example end of arm tool 300 may include a pair of movable forks 315 movably coupled to a rear face of the mounting plate 302. The example end of arm tool 300 may further include any and all of the various features described with respect to the example end of arm tool 155 of FIGS. 2A-2D.

For example, the pair of movable forks 315 may include respective rotatable joints 317, such as hinges, pins, rods, beatings, or other rotatable connections, along respective portions of the movable forks 315. In addition, actuators (not shown), such as motors, gear drives, or other rotary actuators, may be configured to rotate the pair of movable forks 315 around the rotatable joints 317. In the lifting position shown in FIG. 3A, the pair of movable forks 315 may be rotated around the rotatable joints 317 by respective actuators to extend forward, e.g., at a defined distance below the pair of static forks 305. In addition, in the storage position shown in FIG. 3B, the pair of movable forks 315 may be rotated around the rotatable joints 317 by respective actuators to extend backward and/or upward, e.g., substantially along the rear face of the mounting plate 302.

FIG. 4A is a side schematic diagram of yet another example end of arm tool 400 with movable forks in a lifting position, and FIG. 4B is a side schematic diagram of the example end of arm tool 400 of FIG. 4A with movable forks in a storage position, in accordance with disclosed implementations.

As shown in FIGS. 4A and 4B, the example end of arm tool 400 may include a mounting plate 402 and a pair of static forks 405 coupled to and extending from a front face of the mounting plate 402. In addition, the example end of arm tool 400 may include a pair of movable forks 415 movably coupled to a rear face of the mounting plate 402. The example end of arm tool 400 may further include any and all of the various features described with respect to the example end of arm tool 155 of FIGS. 2A-2D.

For example, the pair of movable forks 415 may include respective linearly movable connections, such as grooves, channels, slots, slides, or other linearly movable connections, associated with or coupled to a rear face of the mounting plate 402. In addition, actuators (not shown), such as solenoids, pistons and cylinders, rack and pinion drives, worm screws or drives, or other linear actuators, may be configured to move the pair of movable forks 415 relative to the mounting plate 402 and static forks 405. In the lifting position shown in FIG. 4A, the pair of movable forks 415 may be moved linearly downward relative to the mounting plate 402 and static forks 405 by respective actuators to extend forward, e.g., at a defined distance below the pair of static forks 405. In addition, in the storage position shown in FIG. 4B, the pair of movable forks 415 may be moved linearly upward relative to the mounting plate 402 and static forks 405 by respective actuators to extend forward, e.g., adjacent to, proximate to, aligned with, or in contact with the pair of static forks 405.

Figures 5A, 5B:
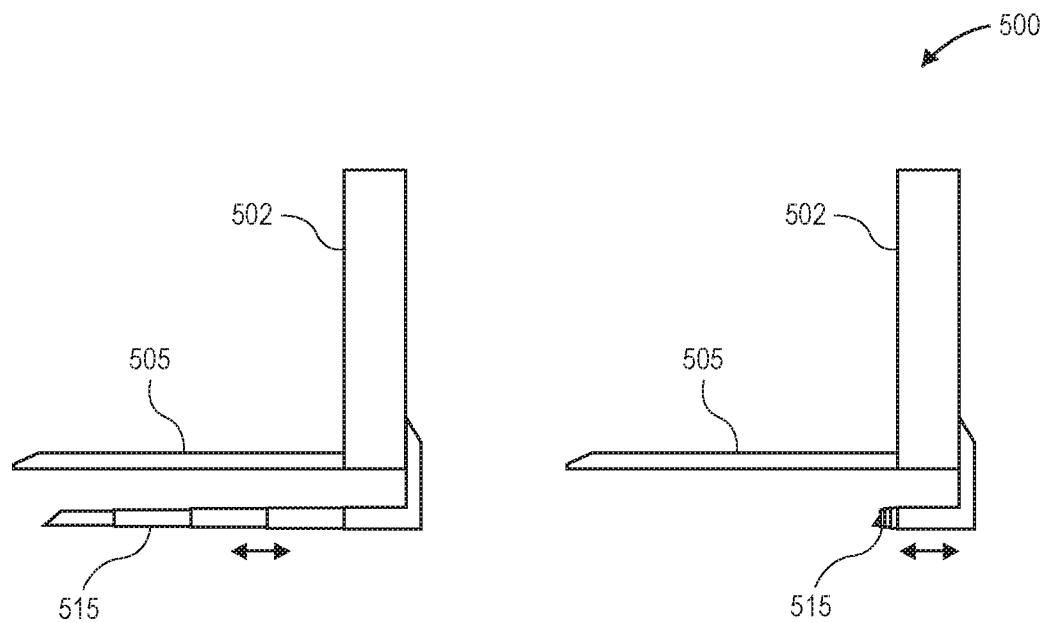
FIG. 5A is a side schematic diagram of a further example end of arm tool with movable forks in a lifting position.
FIG. 5B is a side schematic diagram of the example end of arm tool of FIG. 5A with movable forks in a storage position, in accordance with disclosed implementations.

FIG. 5A is a side schematic diagram of a further example end of arm tool 500 with movable forks in a lifting position, and FIG. 5B is a side schematic diagram of the example end of arm tool 500 of FIG. 5A with movable forks in a storage position, in accordance with disclosed implementations.

As shown in FIGS. 5A and 5B, the example end of arm tool 500 may include a mounting plate 502 and a pair of static forks 505 coupled to and extending from a front face of the mounting plate 502. In addition, the example end of arm tool 500 may include a pair of telescopically movable forks 515 coupled to a rear face of the mounting plate 502. The example end of arm tool 500 may further include any and all of the various features described with respect to the example end of arm tool 155 of FIGS. 2A-2D.

For example, the pair of telescopically movable forks 515 may include respective telescoping sections, such as tubes, pipes, conduits, channels, or other telescopically movable connections, associated with or coupled to a rear face of the mounting plate 502. In addition, actuators (not shown), such as solenoids, pistons and cylinders, rack and pinion drives, worm screws or drives, or other linear actuators, may be configured to move the pair of telescopically movable forks 515 relative to the mounting plate 502 and static forks 505. in the lifting position shown in FIG. 5A, the pair of telescopically movable forks 515 may be extended or elongated relative to the mounting plate 502 and static forks 505 by respective actuators to extend forward, e.g., at a defined distance below the pair of static forks 505. In addition, in the storage position shown in FIG. 5B, the pair of telescopically movable forks 515 may be retracted or shortened relative to the mounting plate 502 and static forks 505 by respective actuators, e.g., adjacent to, proximate to, aligned with, or in contact with the mounting plate 502.

Figures 6A, 6B:
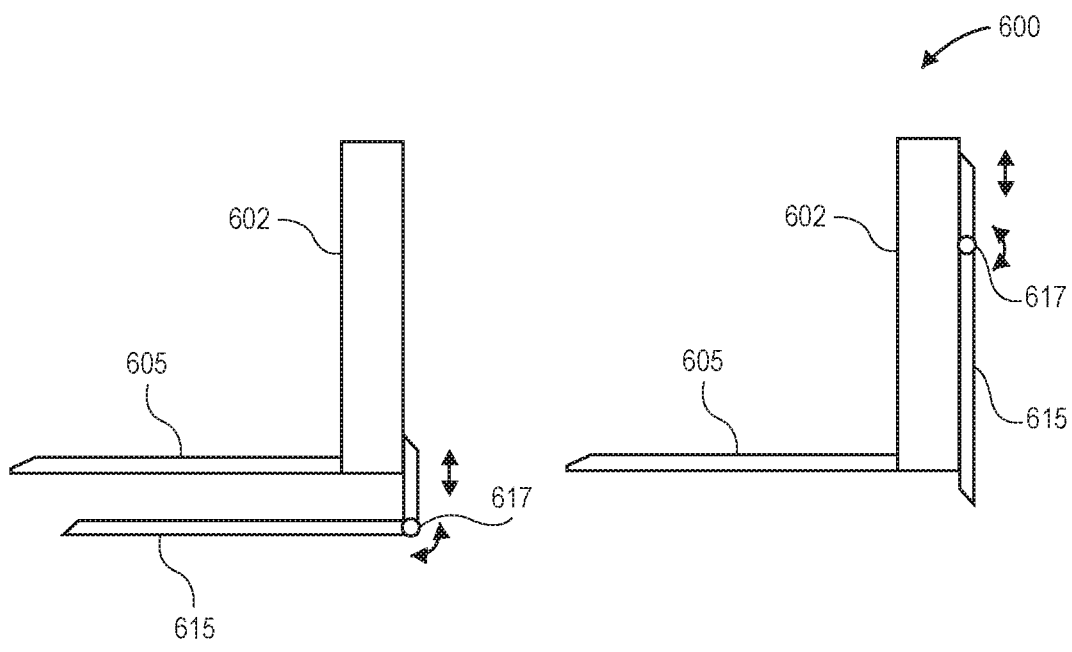
FIG. 6A is a side schematic diagram of a still further example end of arm tool with movable forks in a lifting position.
FIG. 6B is a side schematic diagram of the example end of arm tool of FIG. 6A with movable forks in a storage position, in accordance with disclosed implementations.

FIG. 6A is a side schematic diagram of a still further example end of arm tool 600 with movable forks in a lifting position, and FIG. 6B is a side schematic diagram of the example end of arm tool 600 of FIG. 6A with movable forks in a storage position, in accordance with disclosed implementations.

As shown in FIGS. 6A and 6B, the example end of arm tool 600 may include a mounting plate 602 and a pair of static forks 605 coupled to and extending from a front face of the mounting plate 602. In addition, the example end of arm tool 600 may include a pair of movable forks 615 movably coupled to a rear face of the mounting plate 602. The example end of arm tool 600 may further include any and all of the various features described with respect to the example end of arm tool 155 of FIGS, 2A-2D.

For example, the pair of movable forks 615 may include respective rotatable joints 617, such as hinges, pins, rods, bearings, or other rotatable connections, along respective portions of the movable forks 615. and the pair of movable forks 615 may also include respective linearly movable connections, such as grooves, channels, slots, slides, or other linearly movable connections, associated with or coupled to a rear face of the mounting plate 602. In addition, actuators (not shown), such as motors, gear drives, or other rotary actuators, may be configured to rotate the pair of movable forks 615 around the rotatable joints 617, and actuators (not shown), such as solenoids, pistons and cylinders, rack and pinion drives, worm screws or drives, or other linear actuators, may be configured to move the pair of movable forks 615 relative to the mounting plate 602 and static forks 605. In the lifting position shown in FIG. 6A, the pair of movable forks 615 may be rotated around the rotatable joints 617 by respective actuators to extend forward, and the pair of movable forks 615 may be moved linearly downward relative to the mounting plate 602 and static forks 605 by respective actuators to extend forward, e.g., at a defined distance below the pair of static forks 605. In addition, in the storage position shown in FIG. 6B, the pair of movable forks 615 may be rotated around the rotatable joints 617 by respective actuators to extend along or align with the mounting plate 602, and the pair of movable forks 615 may be moved linearly upward relative to the mounting plate 602 and static forks 605 by respective actuators to extend along or align with the mounting plate 602, e.g., substantially adjacent to, proximate to, aligned with, or in contact with the rear face of the mounting plate 602.

Although FIGS. 2A-6B and the example embodiments described herein generally refer to example end of arm tools having a first pair or set of static forks and a second pair or set of movable forks, in other example embodiments, the example end of arm tools may include various other numbers, combinations, or arrangements of static forks and movable forks. For example, an example end of arm tool may include one or more pairs or sets of static forks in combination with one or more pairs or sets of movable forks having associated movable connections and actuators. In addition, an example end of arm tool may include various combinations of the different example embodiments of movable forks and associated connections and actuators described at least with respect to FIGS. 2A-6B. Furthermore, although the example embodiments described herein generally refer to manipulating pallets using the example end of arm tools, in other example embodiments, various other types of objects, such as totes, bins, cases, or other containers, may be manipulated using example end of arm tools that are sized and/or shaped to lift, place, move, replenish, or otherwise manipulate such various other types of objects.

Figure 7:
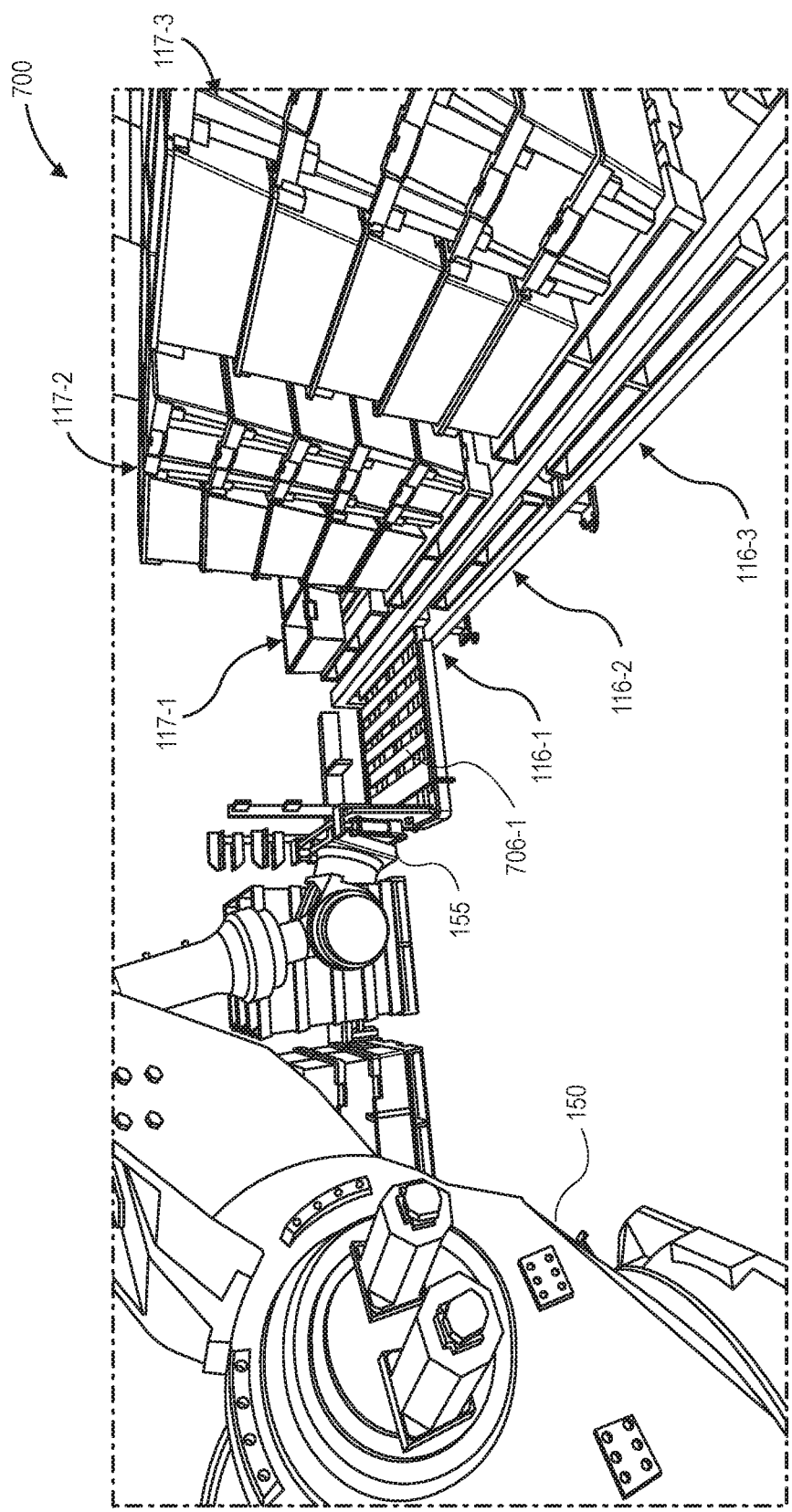
FIG. 7 is a schematic diagram of an example pallet replenishment within a portion of an example palletizing system, in accordance with disclosed implementations.

FIG. 7 is a schematic diagram of an example pallet replenishment 700 within a portion of an example palletizing system, in accordance with disclosed implementations.

As further described at least with respect to the example pallet replenishment station 102 of FIG. 1 and the pallet replenishment process 1000 of FIG. 10, an empty pallet may be singulated from a stack of empty pallets using a robotic arm and an example end of arm tool, the empty pallet may be checked or verified for dimensions, structure, or other aspects of the empty pallet to determine whether the empty pallet is acceptable for use by the palletizing system, and the checked or verified empty pallet may be transferred from the pallet replenishment station to a pallet loading area 115, as described with respect to FIG. 1, using a robotic arm and an example end of arm tool.

As shown in FIG. 7, the pallet loading area 115 may comprise a plurality of empty pallet staging positions 116-1, 116-2, 116-3 and a plurality of pallet loading positions 117-1, 117-2, 117-3. For example, the empty pallet staging positions 116 may be positioned below and substantially vertically aligned with pallet loading positions 117. Using a robotic arm and an example end of arm tool 155, as described with respect to FIGS. 2A-2D, an empty pallet 706-1 may be transferred from the pallet replenishment station to an empty pallet staging position 116-1 at the pallet loading area 115. As shown in FIG. 7, the robotic arm 150 may utilize the pair of static forks of the end of arm tool 155 to lift, move, and place the empty pallet 706-1 at the empty pallet staging position 116-1, and the pair of movable forks of the end of arm tool 155 may be actuated to the storage or non-use position during such operation or process. Similar operations or processes may be performed using the robotic arm 150 and the example end of arm tool 155 to place empty pallets at each of the other empty pallet staging positions 116-2, 116-3.

FIGS. 8A-8D are schematic diagrams of an example pallet transfer 800A-800D within a portion of an example palletizing system, in accordance with disclosed implementations.

As shown in FIGS. 8A-8D, the pallet loading area 115 may comprise a plurality of empty pallet staging positions, only one of which is labeled as empty pallet staging position 116-2, and a plurality of pallet loading positions, only one of which is labeled as pallet loading position 117-2. For example, the empty pallet staging position 116-2 may be positioned below and substantially vertically aligned with pallet loading position 117-2. In addition, a vertical distance between the empty pallet staging position 116-2 and the pallet loading position 117-2 may correspond to the defined distance between the pair of static forks 205 and the pair of movable forks 215 of an example end of arm tool 155 coupled to robotic arm 150, such that each of the pair of static forks 205 and the pair of movable forks 215 may manipulate pallets substantially simultaneously and/or concurrently.

Figure 8A:
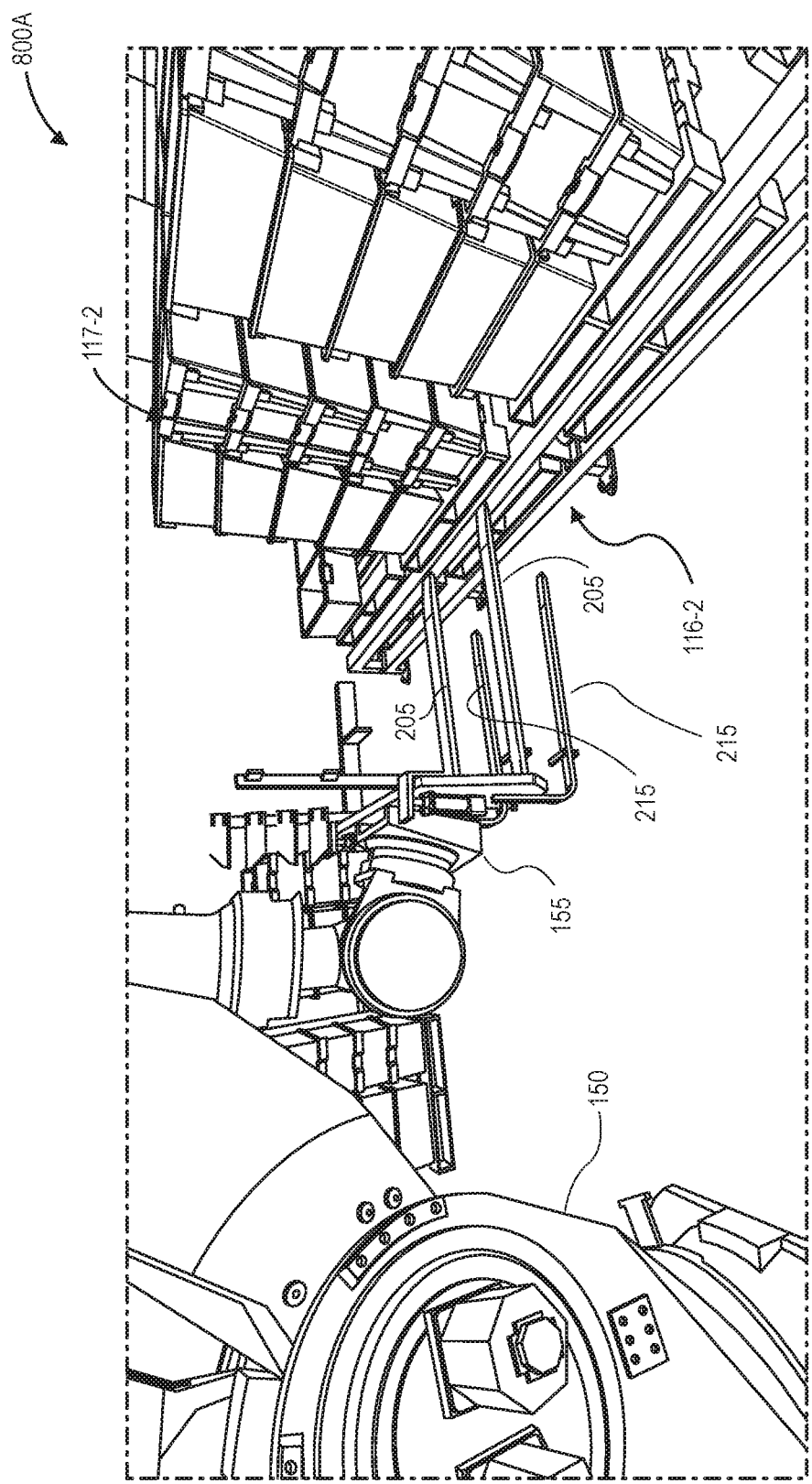
FIGS. 8A-8D are schematic diagrams of an example pallet transfer within a portion of an example palletizing system, in accordance with disclosed implementations.

As shown in FIG. 8A, in order to lift an empty pallet from empty pallet staging position 116-2 and lift an at least partially loaded pallet from pallet loading position 117-2 substantially simultaneously and/or concurrently, the pair of movable forks 215 of the example end of arm tool 155 may be actuated to the lifting position, such that the pair of movable forks 215 is positioned at a defined distance below the pair of static forks 205. Then, the robotic arm 150 may move the end of arm tool 155 such that the pair of movable forks 215 are positioned to lift the empty pallet at empty pallet staging position 116-2 and the pair of static forks 205 are positioned to lift the at least partially loaded pallet at pallet loading position 117-2. In other words, the robotic arm 150 may insert the pair of movable forks 215 into the empty pallet and insert the pair of static forks 205 into the at least partially loaded pallet in preparation for simultaneous and/or concurrent lifting of both pallets.

Figure 8B:
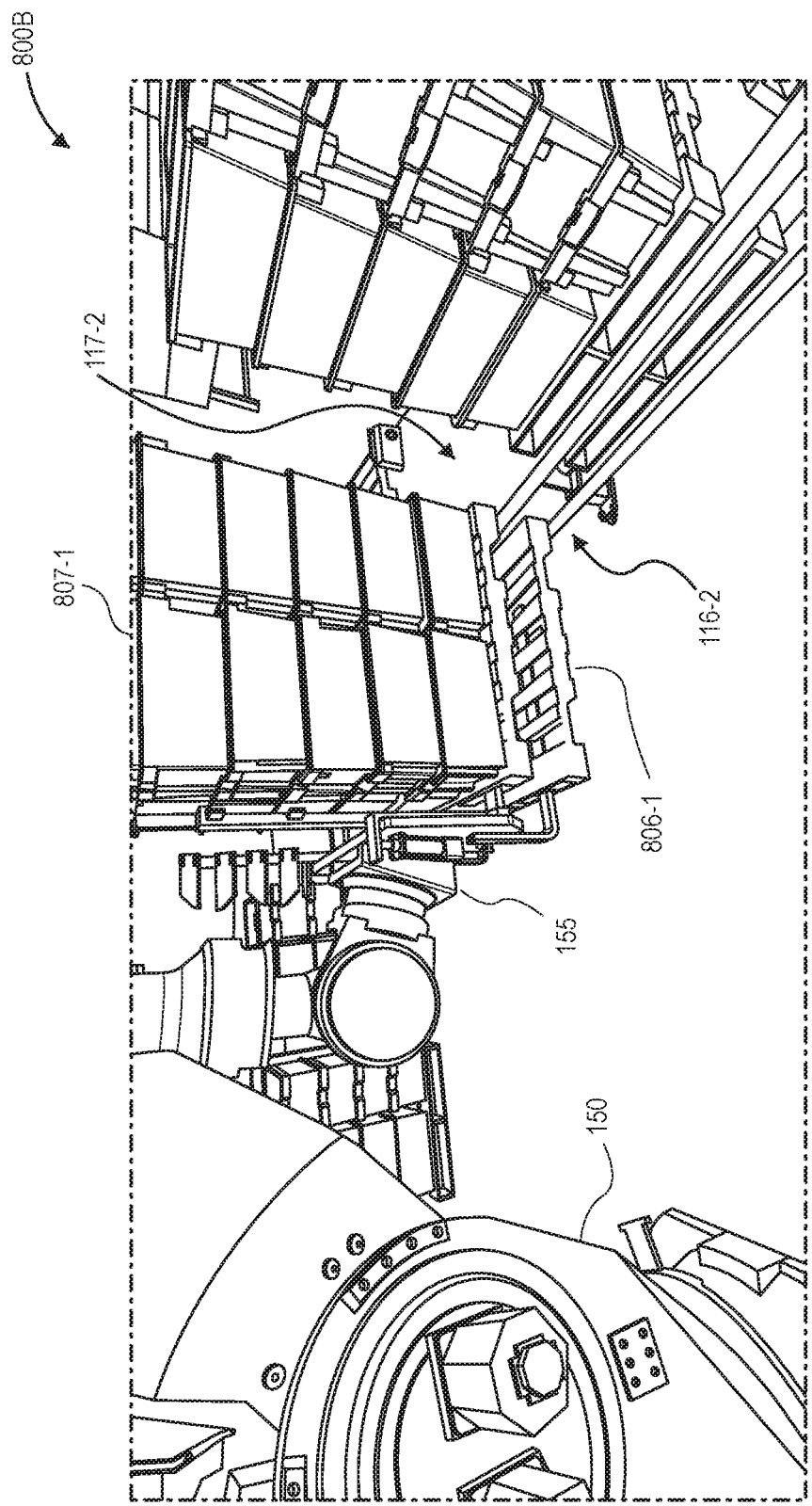

Then, as shown in FIG. 8B, in order to remove the empty pallet from empty pallet staging position 116-2 and remove the at least partially loaded pallet from pallet loading position 117-2 substantially simultaneously and/or concurrently, the robotic arm 150 may move the end of arm tool 155 upward such that the pair of movable forks 215 lift the empty pallet from empty pallet staging position 116-2 and the pair of static forks 205 lift the at least partially loaded pallet from pallet loading position 117-2. In other words, the robotic arm 150 may raise or lift the pair of movable forks 215 previously inserted into the empty pallet and raise or lift the pair of static forks 205 previously inserted into the at least partially loaded pallet for simultaneous and/or concurrent lifting of both pallets. Then, responsive to lifting the empty pallet from empty pallet staging position 116-2 and lifting the at least partially loaded pallet from pallet loading position 117-2, the robotic arm 150 may move the end of arm tool 155 rearward or outward from the pallet loading area 115 such that the pair of movable forks 215 remove the empty pallet from empty pallet staging position 116-2 and the pair of static forks 205 remove the at least partially loaded pallet from pallet loading position 117-2. At this stage of the operation or process, as shown in FIG. 8B, each of the empty pallet staging position 116-2 and the pallet loading position 117-2 may be empty, the pair of movable forks 215 may be carrying an empty pallet 806-1, and the pair of static forks 205 may be carrying an at least partially loaded pallet 807-1.

Figure 8C:
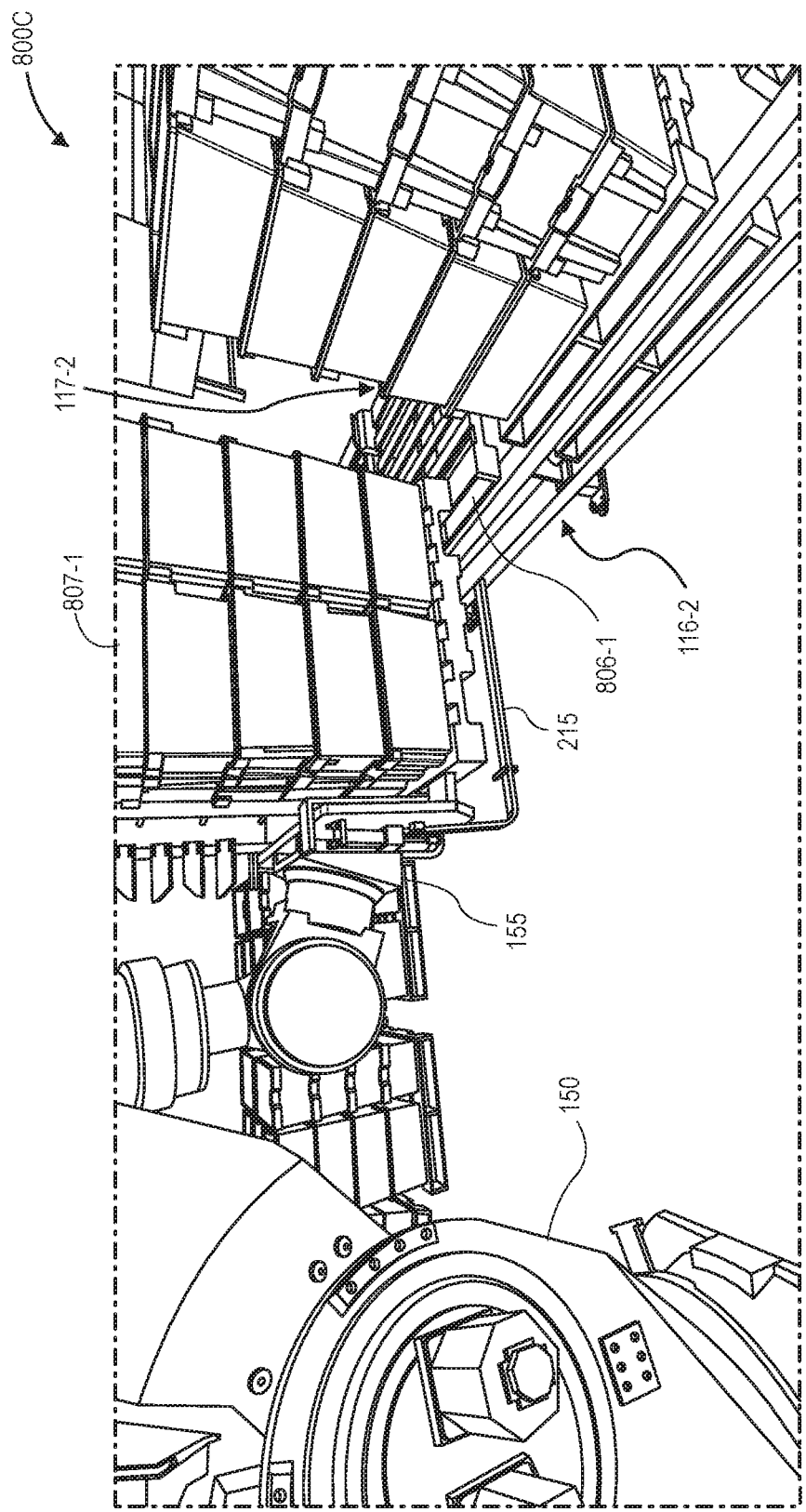

Then, as shown in FIG. 8C, in order to place the empty pallet 806-1 at the pallet loading position 117-2, the robotic arm 150 may move the end of arm tool 155 upward and forward or toward the pallet loading area 115 such that the pair of movable forks 215 and the empty pallet 806-1 are positioned above the pallet loading position 117-2. Then, the robotic arm 150 may move the end of arm tool 155 downward toward the pallet loading position 117-2 to place the empty pallet 806-1 at the pallet loading position 117-2. The robotic arm 150 may then move the end of arm tool 155 rearward or outward from the pallet loading area 115 such that the pair of movable forks 215 is removed from the empty pallet 806-1. At this stage of the operation or process, as shown in FIG. 8C, the empty pallet 806-1 may be placed at the pallet loading position 117-2 in preparation for loading of one or more objects onto the empty pallet 806-1, the empty pallet staging position 116-2 may be empty and ready for potential replenishment using the process described at least with respect to FIGS. 7 and 10, the pair of movable forks 215 may be removed from the empty pallet 806-1 and may not carry any objects, and the pair of static forks 205 may continue carrying the at least partially loaded pallet 807-1.

Figure 8D:
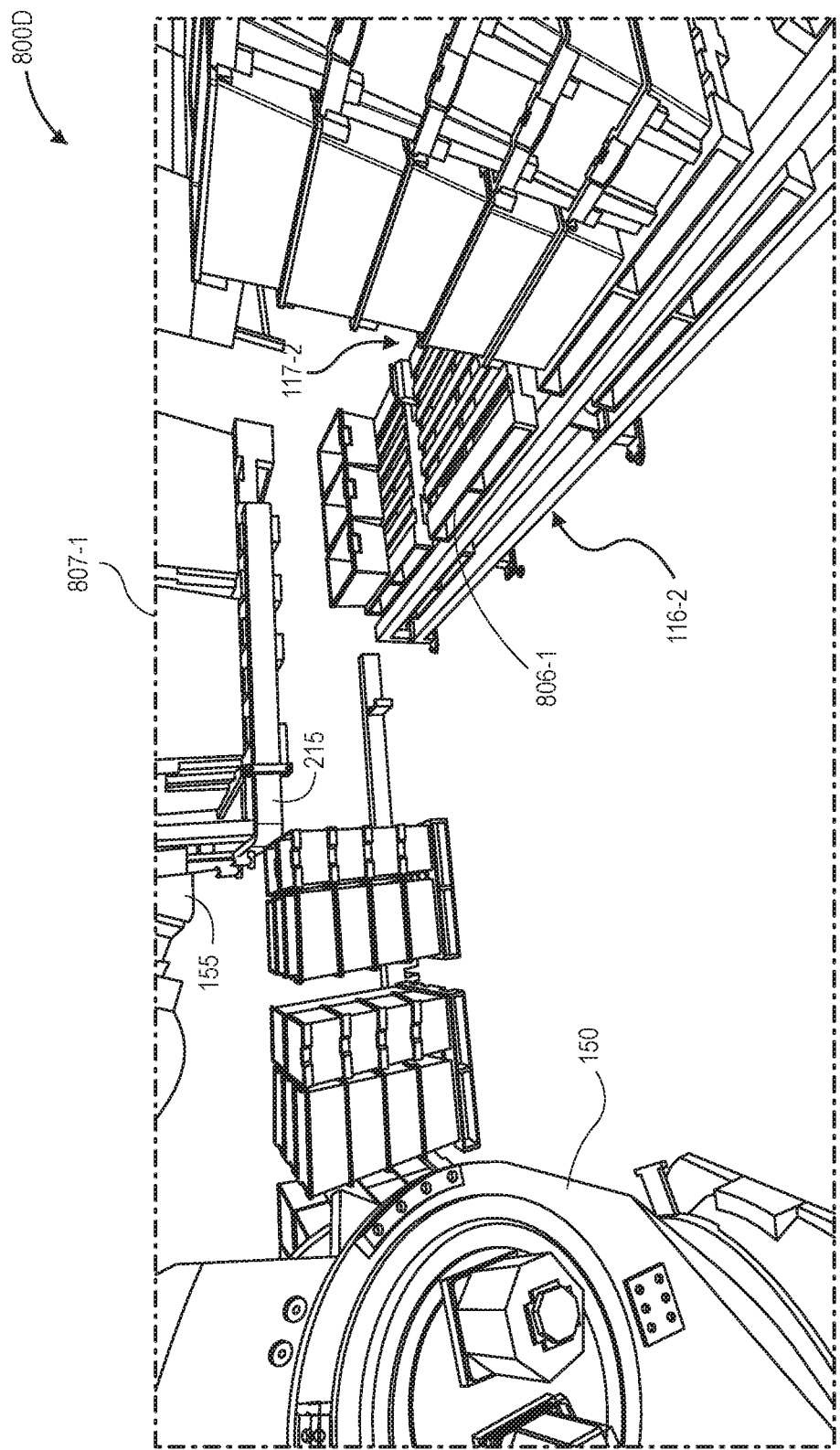

Thereafter, as shown in FIG. 8D, in order to transfer the at least partially loaded pallet 807-1 to a downstream station or process, the robotic arm 150 may move the end of arm tool 155 away from the pallet loading area 115 and toward a downstream station, such as the pallet buffer station 120, the pallet wrapping station 130, the pallet labeling station 140, the pallet transport station 160, and/or other downstream stations or processes as described at least with respect to FIG. 1. In addition, the pair of movable forks 215 of the example end of arm tool 155 may be actuated to the storage position, as shown in FIG. 8D, such that the pair of movable forks 215 is positioned outboard of the pair of static forks 205, or at various other storage positions associated with other example embodiments of the end of arm tool. The actuation of the pair of movable forks 215 of the end of arm tool 155 to the storage position may occur substantially simultaneously and/or concurrently with movement of the at least partially loaded pallet 807-1 to a downstream station or process by the robotic arm 150, and/or may occur as soon as the pair of movable forks 215 is removed from the empty pallet 806-1 or as soon as the pair of movable forks 215 is otherwise determined as not carrying or inserted into any objects.

By the use of the example end of arm tools described herein having at least a pair of static forks and a pair of movable forks, removal of empty pallets and at least partially loaded pallets from a pallet loading area may occur substantially simultaneously and/or concurrently, thereby reducing cycle time normally required for separate or independent pallet removal processes. In addition, by the use of the example end of arm tools described herein having at least a pair of static forks and a pair of movable forks, placement of empty pallets at vacant pallet loading positions of a pallet loading area may occur more quickly, thereby reducing cycle time normally required for separate or independent pallet placement processes. Further, by the use of the example end of arm tools described herein having at least a pair of static forks and a pair of movable forks, transfer and placement of at least partially loaded pallets from a pallet loading area to downstream stations or processes may occur substantially according to normal or conventional processes, without any delay caused or introduced by use of the example end of arm tools. Moreover, by the use of the example end of arm tools described herein having at least a pair of static forks and a pair of movable forks, transfer and placement of empty pallets from a pallet replenishment station to empty pallet staging positions of a pallet loading area may also occur substantially according to normal or conventional processes, without any delay caused or introduced by use of the example end of arm tools.

Figure 9:
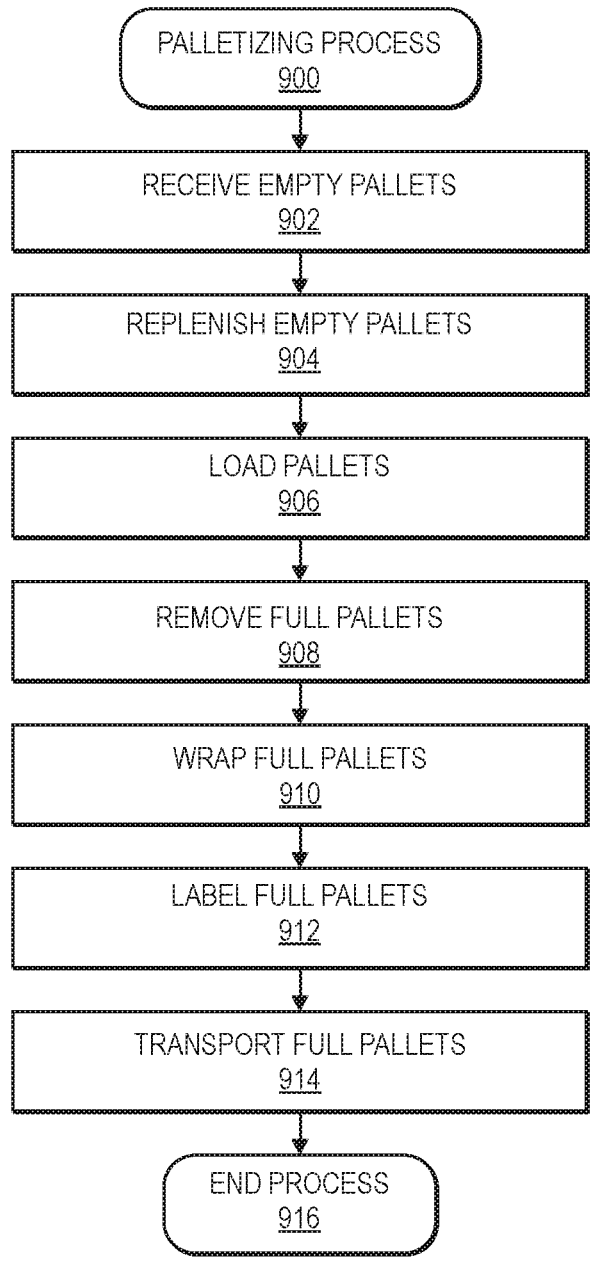
FIG. 9 is a flow diagram illustrating an example palletizing process, in accordance with disclosed implementations.

FIG. 9 is a flow diagram illustrating an example palletizing process 900, in accordance with disclosed implementations.

The process 900 may begin by receiving empty pallets, as at 902. For example, a pallet replenishment station may receive one or more empty pallets or stacks of empty pallets from various upstream stations or processes. Various automated, robotic, and/or manual systems or processes may transfer the empty pallets from upstream stations or processes to the pallet replenishment station. Further, a control system may instruct, direct, or command the various systems or processes associated with receiving empty pallets at the pallet replenishment station.

The process 900 may continue by replenishing empty pallets, as at 904. For example, one or more conveyors, in combination with a robotic arm and end of arm tool, may singulate empty pallets or stacks of empty pallets. In addition, a pallet check or verification station may verify dimensions, structure, or other aspects of the singulated empty pallet. Then, a robotic arm and end of arm tool, e.g., using a pair of static forks, may lift, move, and place the checked or verified empty pallet at an empty pallet staging position associated with a pallet :loading station. As empty pallets are used at the pallet loading station and as empty pallet staging positions become vacant, the robotic arm and end of arm tool may continue to lift, move, and place checked or verified empty pallets at empty pallet staging positions associated with the pallet loading station. Further, a control system may instruct, direct, or command the various systems or processes associated with replenishing empty pallets from the pallet replenishment station to the pallet loading station.

The process 900 may proceed by loading pallets, as at 906. For example, a robotic arm and end of arm tool, e.g., using a pair of movable forks, may lift, move, and place empty pallets from empty pallet staging positions of the pallet loading station to pallet loading positions of the pallet loading station. Then, a loading manipulator, in combination with one or more conveyors or other material handling equipment that transfer objects to the pallet loading station, may load one or more objects onto one or more pallets at respective pallet loading positions of the pallet loading station. Various types of objects may be loaded onto the pallets, such as totes, bins, cases, boxes, products, items, or other objects. As pallets are loaded and removed from the pallet loading station and as pallet loading positions become vacant, the robotic arm and end of arm tool may continue to lift, move, and place empty pallets from empty pallet staging positions to pallet loading positions of the pallet loading station in order to continue loading pallets. Further, a control system may instruct, direct, or command the various systems or processes associated with loading pallets at the pallet loading station.

The process 900 may then continue with removing full pallets, as at 908. For example, upon completion of loading of a pallet with objects at a pallet loading position of the pallet loading station, a robotic arm and end of arm tool, e.g., using a pair of static forks, may lift, move, and place the at least partially loaded pallets from pallet loading positions of the pallet loading station to downstream stations or processes. As pallets are loaded and completed at pallet loading positions of the pallet loading station, the robotic arm and end of arm tool may continue to lift, move, and place the at least partially loaded pallets from pallet loading positions to downstream stations or processes in order to continue loading pallets. Moreover, with the use of the robotic arm and example end of arm tools described herein, at least portions of the lifting, movement, and placement of empty pallets from empty pallet staging positions to pallet loading positions, and the lifting, movement, and placement of loaded pallets from pallet loading positions to downstream stations or processes may occur substantially simultaneously and/or concurrently, thereby reducing cycle time associated with such operations and processes. Further, a control system may instruct, direct, or command the various systems or processes associated with removing full pallets from the pallet loading station.

The process 900 may then proceed with wrapping full pallets, as at 910. For example upon receipt of an at least partially loaded pallet at the pallet wrapping station, a wrapping machine and a rotatable conveyor may rotate and wrap the loaded pallet. In some example embodiments, the wrapping machine and the rotatable conveyor may wrap two or more pallets that are stacked together. Further, a control system may instruct, direct, or command the various systems or processes associated with wrapping full pallets at the pallet wrapping station.

The process 900 may then continue to label full pallets, as at 912. For example upon receipt of an at least partially loaded pallet, which may have been wrapped at the pallet wrapping station, a labeling machine and a rotatable conveyor may rotate and label the loaded pallet. In some example embodiments, the labeling machine and the rotatable conveyor may label a plurality of surfaces of one or more pallets that are stacked and/or wrapped together. Further, a control system may instruct, direct, or command the various systems or processes associated with labeling full pallets at the pallet labeling station.

The process 900 may then proceed to transport full pallets, as at 914. For example upon receipt of an at least partially loaded pallet, which may have been wrapped at the pallet wrapping station and/or labeled at the pallet labeling station, one or more conveyors or other material handling equipment may cause transport of the loaded pallet to various downstream stations or processes. Further, a control system may instruct, direct, or command the various systems or processes associated with transporting full pallets at the pallet transport station. The process 900 may then end, as at 916.

FIG. 10 is a flow diagram illustrating an example pallet replenishment process 1000, in accordance with disclosed implementations.

The process 1000 may begin by lifting a stack of empty pallets except for a bottom-most empty pallet using static forks of an example end of arm tool, as at 1002. For example, a robotic arm and end of arm tool may utilize a pair of static forks to lift the stack of empty pallets from one or more conveyors, with the exception of a bottom-most empty pallet from the stack, such that the bottom-most empty pallet remains on the one or more conveyors. Further, a control system may instruct, direct, or command the various systems or processes associated with lifting a stack of empty pallets using a pair of static forks of an end of arm tool coupled to a robotic arm.

The process 1000 may proceed by singulating the bottom-most empty pallet using one or more conveyors, as at 1004. For example, the one or more conveyors may move and singulate the bottom-most empty pallet to a different position associated with the one or more conveyors. Further, a control system may instruct, direct, or command the various systems or processes associated with moving and singulating an empty pallet from a stack of empty pallets using one or more conveyors.

The process 1000 may continue by placing the stack of empty pallets back onto the one or more conveyors, as at 1006. For example, the robotic arm and end of arm tool that lifted the stack of empty pallets utilizing the pair of static forks may place the stack of empty pallets back onto the one or more conveyors, with the exception of a bottom-most empty pallet from the stack that has been moved and singulated by one or more conveyors. Further, a control system may instruct, direct, or command the various systems or processes associated with placing a stack of empty pallets using a pair of static forks of an end of arm tool coupled to a robotic arm.

The process 1000 may proceed with checking specifications of the singulated pallet, as at 1008. For example, the one or more conveyors may move the singulated pallet to a pallet check station at which various sensors, such as photoelectric sensors, photoeyes, proximity sensors, imaging sensors, weight sensors, or other types of sensors, may check or verify dimensions, structure, or other aspects of the singulated pallet. Further, a control system may instruct, direct, or command the various systems or processes associated with checking specifications of a singulated pallet using a plurality of sensors associated with a pallet check station.

The process 1000 may then continue with determining whether the singulated pallet meets specifications, as at 1010. For example, a palletizing system may be configured or sized to receive and utilize pallets having particular specifications with respect to dimensions, structure, weight, or other aspects, such as maximum specifications, minimum specifications, acceptable ranges or tolerances, one or more threshold values, or other ranges or values. Various specifications of pallets may correspond to sizes or shapes of empty pallet staging positions, sizes or shapes of pallet loading positions, sizes or shapes associated with pallet locations at various stations of a palletizing system, characteristics associated with objects to be loaded onto pallets, movement characteristics of a robotic arm and end of arm tool, dimensional characteristics of pairs of static forks or movable forks to manipulate pallets, and/or other specifications. Further, a control system may instruct, direct, or command the various systems or processes associated with checking whether detected or measured specifications of a singulated pallet meet acceptable specifications for a palletizing system.

If the singulated pallet meets specifications, the process 1000 may proceed to lift and transfer the singulated pallet using static forks to an empty pallet staging position of the pallet loading station, as at 1012. For example, a robotic arm and end of arm tool may utilize a pair of static forks to lift the singulated pallet from the one or more conveyors and/or the pallet check station, and transfer the singulated pallet to an empty pallet staging position of the pallet loading station. Further, a control system may instruct, direct, or command the various systems or processes associated with lifting and transferring a singulated pallet from a pallet replenishment station to a pallet loading station using a pair of static forks of an end of arm tool coupled to a robotic arm. The process may then end, as at 1016.

If, however, the singulated pallet does not meet specifications, the process 1000 may continue to lift and transfer the singulated pallet using static forks to a rework area, as at 1014. For example, a robotic arm and end of arm tool may utilize a pair of static forks to lift the singulated pallet from the one or more conveyors and/or the pallet check station, and transfer the singulated pallet to a rework area or bin of the pallet replenishment station. Further, a control system may instruct, direct, or command the various systems or processes associated with lifting and transferring a singulated pallet to a rework area or bin of the pallet replenishment station using a pair of static forks of an end of arm tool coupled to a robotic arm. The process may then return to step 1002 to singulate and check specifications of another empty pallet.

Figure 11A:
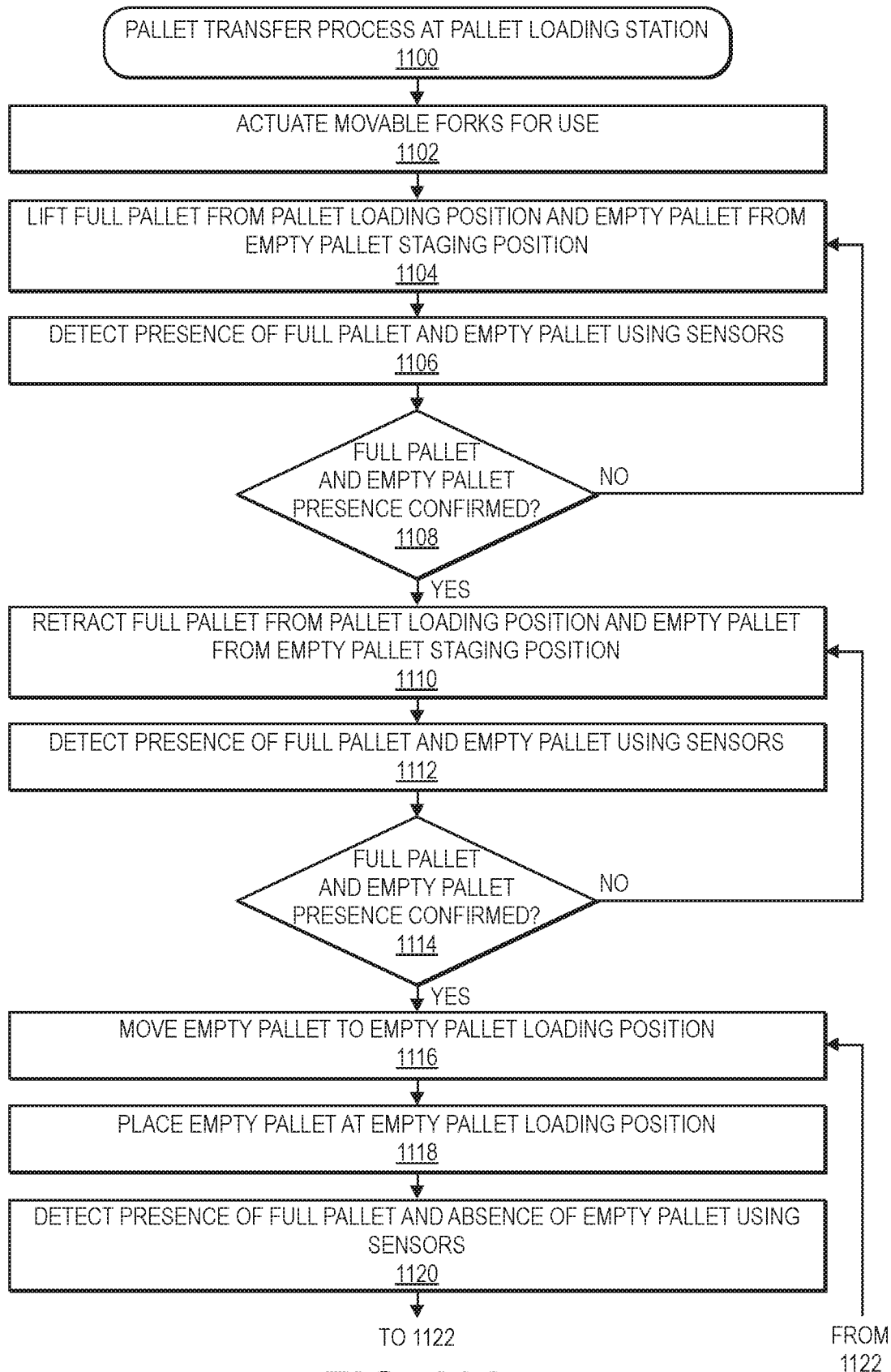
FIGS. 11A and 11B is a flow diagram illustrating an example pallet transfer process at a pallet loading station, in accordance with disclosed implementations.
Figure 11B:
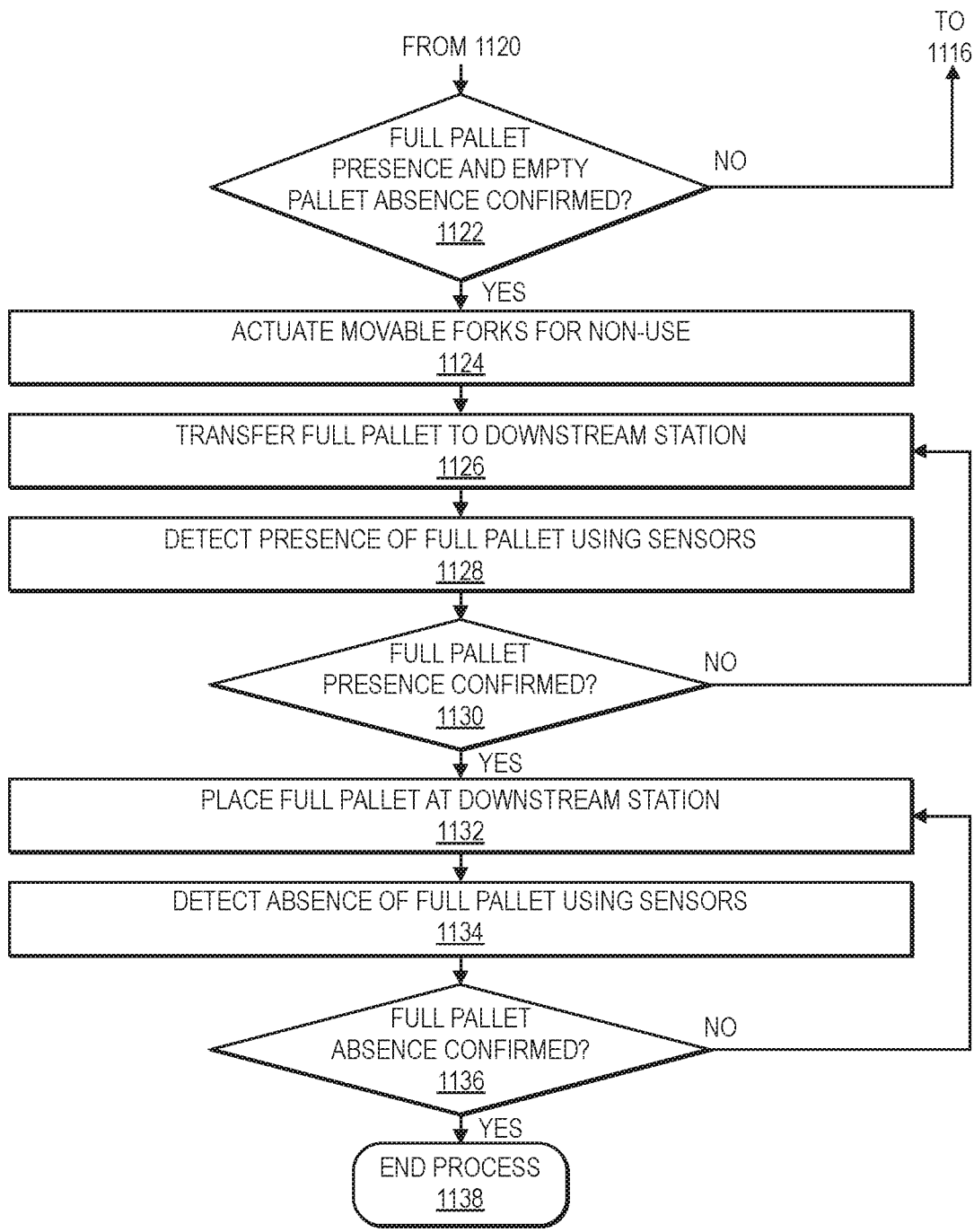

FIGS. 11A and 11B is a flow diagram illustrating an example pallet transfer process at a pallet loading station 1100, in accordance with disclosed implementations.

The process 1100 may begin by actuating movable forks for use, as at 1102. For example, a robotic arm and end of arm tool may actuate a pair of movable forks to a lifting or use position from a storage or non-use position. In the lifting position, the pair of movable forks may generally be aligned vertically below and at a defined distance below a pair of static forks associated with the end of arm tool. In addition, positions of the pair of movable forks, such as the lifting position, may be determined and/or verified based on data received from one or more sensing elements associated with actuators that actuate the pair of movable forks, such as switches, toggles, encoders, or other sensing elements or devices that may detect or monitor actuated positions of the actuators corresponding to positions of the pair of movable forks. Further, a control system may instruct, direct, or command the various systems or processes associated with actuating a pair of movable forks of an end of arm tool coupled to a robotic arm to a lifting position.

The process 1100 may proceed by lifting a full pallet from a pallet loading position and an empty pallet from an empty pallet staging position, as at 1104. For example, the robotic arm and end of arm tool having a pair of static forks, as well as a pair of movable forks actuated to a lifting position, may insert the pair of static forks into an at least partially loaded pallet at a pallet loading position, may insert the pair of movable forks into an empty pallet at an empty pallet staging position, and may lift each of the at least partially loaded pallet and the empty pallet. Further, a control system may instruct, direct, or command the various systems or processes associated with inserting and lifting a pair of static forks and a pair of movable forks into a loaded pallet and an empty pallet, respectively, using an end of arm tool coupled to a robotic arm.

The process 1100 may then detect the presence of the full pallet and the empty pallet using one or more sensors, as at 1106. For example, one or more photoelectric sensors, photoeyes, or proximity sensors, e.g., associated with each of the pair of static forks and the pair of movable forks, the mounting plate, and/or the rails, may detect the presence of each of the loaded pallet (as well as objects loaded onto the pallet) lifted by the pair of static forks, and the empty pallet lifted by the pair of movable forks. Further, a control system may instruct, direct, or command the various systems or processes associated with detecting the presence of a loaded pallet and an empty pallet lifted by each of the pair of static forks and the pair of movable forks, respectively, using an end of arm tool coupled to a robotic arm.

If the presence of the full pallet and the empty pallet is not confirmed, as at 1108, then the process 1100 may return to step 1104 to attempt to lift the full and empty pallets again. Alternatively, various other troubleshooting or verification processes, either automated or manual, may be performed to correct errors in the process.

If, however, the presence of the full pallet and the empty pallet is confirmed, as at 1108, then the process 1100 may proceed to retract the full pallet from the pallet loading position and the empty pallet from the empty pallet staging position, as at 1110. For example, the robotic arm and end of arm tool may retract or remove the loaded pallet lifted by the pair of static forks and the empty pallet lifted by the pair of movable forks from the pallet loading position and the empty pallet staging position, respectively. Further, a control system may instruct, direct, or command the various systems or processes associated with lifting and removing the loaded pallet and the empty pallet using the pair of static forks and the pair of movable forks, respectively, using an end of arm tool coupled to a robotic arm.

The process 1100 may then detect the presence of the full pallet and the empty pallet using one or more sensors, as at 1112. For example, one or more photoelectric sensors, photoeyes, or proximity sensors, e.g., associated with each of the pair of static forks and the pair of movable forks, the mounting plate, and/or the rails, may again detect the presence of each of the loaded pallet (as well as objects loaded onto the pallet) retracted by the pair of static forks, and the empty pallet retracted by the pair of movable forks. Further, a control system may instruct, direct, or command the various systems or processes associated with detecting the presence of a loaded pallet and an empty pallet retracted by each of the pair of static forks and the pair of movable forks, respectively, using an end of arm tool coupled to a robotic arm.

If the presence of the full pallet and the empty pallet is not confirmed, as at 1114, then the process 1100 may return to step 1110 to attempt to retract the full and empty pallets again. Alternatively, various other troubleshooting or verification processes, either automated or manual, may be performed to correct errors in the process.

If, however, the presence of the full pallet and the empty pallet is confirmed, as at 1114, then the process 1100 may proceed to move the empty pallet to the empty or vacant pallet loading position, as at 1116. For example, the robotic arm and end of arm tool may move or extend the empty pallet retracted by the pair of movable forks from the empty pallet staging position to the vacant pallet loading position from which the loaded pallet was retracted by the pair of static forks. Then, the process 1100 may proceed to place the empty pallet at the vacant pallet loading position, as at 1118. For example, the robotic arm and end of arm tool may lower and place the empty pallet at the vacant pallet loading position. Further, a control system may instruct, direct, or command the various systems or processes associated with moving, extending, and placing the empty pallet at a vacant pallet loading position using the pair of movable forks of an end of arm tool coupled to a robotic arm.

The process 1100 may then detect the presence of the full pallet and the absence of the empty pallet using one or more sensors, as at 1120. For example, one or more photoelectric sensors, photoeyes, or proximity sensors, e.g., associated with each of the pair of static forks and the pair of movable forks, the mounting plate, and/or the rails, may again detect the presence of the loaded pallet (as well as objects loaded onto the pallet) retracted by the pair of static forks, and the absence of the empty pallet placed by the pair of movable forks. Further, a control system may instruct, direct, or command the various systems or processes associated with detecting the presence of a loaded pallet retracted by the pair of static forks, and detecting the absence of an empty pallet placed by the pair of movable forks, using an end of arm tool coupled to a robotic arm.

If the presence of the full pallet and the absence of the empty pallet is not confirmed, as at 1122, then the process 1100 may return to step 1116 to attempt to move, extend, and place the empty pallet at the vacant pallet loading position again. Alternatively, various other troubleshooting or verification processes, either automated or manual, may be performed to correct errors in the process.

If, however, the presence of the full pallet and the absence of the empty pallet is confirmed, as at 1122, then the process 1100 may proceed to actuate the movable forks for non-use, as at 1124. For example, a robotic arm and end of arm tool may actuate a pair of movable forks to a storage or non-use position from a lifting or use position. In the storage position, the pair of movable forks may be positioned outboard of the pair of static forks associated with the end of arm tool, and/or may be positioned at various other positions associated with other example embodiments of the end of arm tool, such that the pair of static forks may be utilized for various operations or processes without interference from the pair of movable forks. In addition, positions of the pair of movable forks, such as the storage position, may be determined and/or verified based on data received from one or more sensing elements associated with actuators that actuate the pair of movable forks, such as switches, toggles, encoders, or other sensing elements or devices that may detect or monitor actuated positions of the actuators corresponding to positions of the pair of movable forks. Further, a control system may instruct, direct, or command the various systems or processes associated with actuating a pair of movable forks of an end of arm tool coupled to a robotic arm to a storage position.

Then, the process 1100 may proceed to transfer the full pallet to a downstream station, as at 1126. For example, the robotic arm and end of arm tool may move and transport the loaded pallet to various downstream stations or processes, such as a pallet buffer station, a pallet wrapping station, a pallet labeling station, a pallet transport station, or other stations or processes. Further, a control system may instruct, direct, or command the various systems or processes associated with moving and transporting the loaded pallet to a downstream station or process using the pair of static forks of an end of arm tool coupled to a robotic arm.

The process 1100 may then detect the presence of the full pallet using one or more sensors, as at 1128. For example, one or more photoelectric sensors, photoeyes, or proximity sensors, e.g., associated with the pair of static forks, the mounting plate, and/or the rails, may again detect the presence of the loaded pallet (as well as objects loaded onto the pallet) that is moved and transported by the pair of static forks. Further, a control system may instruct, direct, or command the various systems or processes associated with detecting the presence of a loaded pallet (as well as objects loaded onto the pallet) that is moved and transported by the pair of static forks of an end of arm tool coupled to a robotic arm.

If the presence of the full pallet is not confirmed, as at 1130, then the process 1100 may return to step 1126 to attempt to move and transport the loaded pallet to a downstream station again. Alternatively, various other troubleshooting or verification processes, either automated or manual, may be performed to correct errors in the process.

If, however, the presence of the full pallet is confirmed, as at 1130, then the process 1100 may proceed to place the full pallet at a downstream station, as at 1132. For example, the robotic arm and end of arm tool may place the loaded pallet at various downstream stations or processes, such as a pallet buffer station, a pallet wrapping station, a pallet labeling station, a pallet transport station, or other stations or processes. Further, a control system may instruct, direct, or command the various systems or processes associated with placing the loaded pallet at a downstream station or process using the pair of static forks of an end of arm tool coupled to a robotic arm.

The process 1100 may then detect the absence of the full pallet using one or more sensors, as at 1134. For example, one or more photoelectric sensors, photoeyes, or proximity sensors, e.g., associated with the pair of static forks, the mounting plate, and/or the rails, may detect the absence of the loaded pallet (as well as objects loaded onto the pallet) that is placed by the pair of static forks. Further, a control system may instruct, direct, or command the various systems or processes associated with detecting the absence of a loaded pallet (as well as objects loaded onto the pallet) that is placed by the pair of static forks of an end of arm tool coupled to a robotic arm.

If the absence of the full pallet is not confirmed, as at 1136, then the process 1100 may return to step 1132 to attempt to place the loaded pallet at a downstream station again. Alternatively, various other troubleshooting or verification processes, either automated or manual, may be performed to correct errors in the process.

If, however, the absence of the full pallet is confirmed, as at 1136, then the process 1100 may then end, as at 1138. Further, the process 1100 described herein may be repeated each time that an at least partially loaded pallet is to be removed from a pallet loading position, an empty pallet is to be removed from an empty pallet staging position, the empty pallet is to be placed at the vacated pallet loading position, and the loaded pallet is to be moved to a downstream station or process. Moreover, various portions of the process 1100 may be performed separately or independently, or in different orders or combinations.

Figure 12:
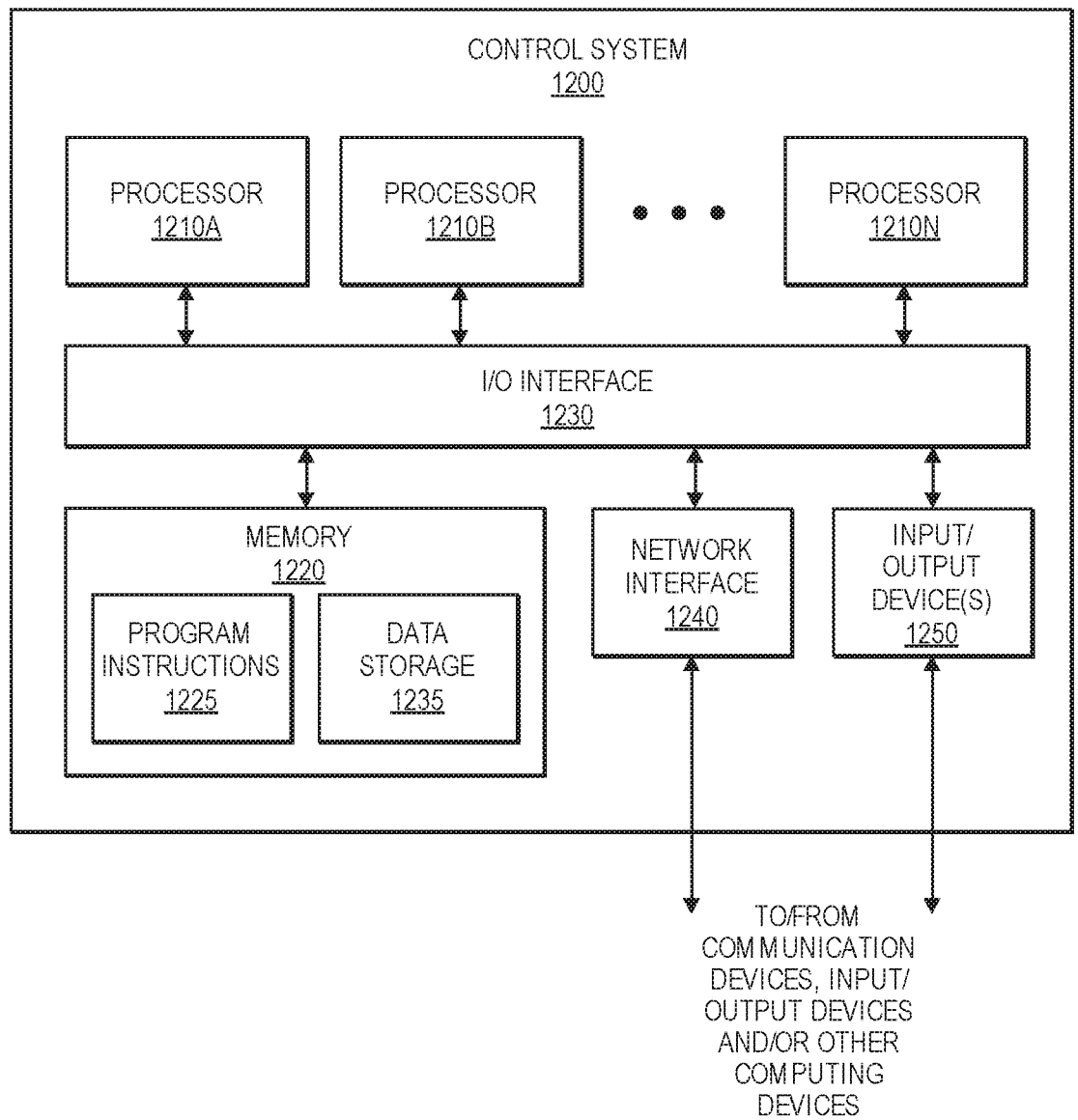
FIG. 12 is a block diagram illustrating an example control system accordance with disclosed implementations.

FIG. 12 is a block diagram illustrating an example control system 1200, in accordance with disclosed implementations.

Various operations of a control system, such as those described herein, may be executed on one or more computer systems, and/or interacting with various other computers, systems, or devices in a material handling facility, according to various implementations. For example, the control system discussed above may function and operate on one or more computer systems. One such control system is illustrated by the block diagram in FIG. 12. In the illustrated implementation, a control system 1200 includes one or more processors 1210A, 1210B through 1210N, coupled to a non-transitory computer-readable storage medium 1220 via an input/output (I/O) interface 1230. The control system 1200 further includes a network interface 1240 coupled to the I/O interface 1230, and one or more input/output devices 1250. In some implementations, it is contemplated that a described implementation may be implemented using a single instance of the control system 1200 while, in other implementations, multiple such systems or multiple nodes making up the control system 1200 may be configured to host different portions or instances of the described implementations. For example, in one implementation, some data sources or services (e.g., related to portions of a palletizing system, operations, or processes, etc.) may be implemented via one or more nodes of the control system 1200 that are distinct from those nodes implementing other data sources or services (e.g., related to other portions of a palletizing system, operations, or processes, etc.).

In various implementations, the control system 1200 may be a uniprocessor system including one processor 1210A, or a multiprocessor system including several processors 1210A-1210N (e.g., two, four, eight, or another suitable number). The processors 1210A-1210N may be any suitable processor capable of executing instructions. For example, in various implementations, the processors 1210A-1210N may be general-purpose or embedded processors implementing any of a variety of instruction set architectures (ISAs), such as the x86, PowerPC, SPARC, or MIPS ISAs, or any other suitable ISA. In multiprocessor systems, each of the processors 1210A-1210N may commonly, but not necessarily, implement the same ISA.

The non-transitory computer-readable storage medium 1220 may be configured to store executable instructions and/or data accessible by the one or more processors 1210A-1210N. In various implementations, the non-transitory computer-readable storage medium 1220 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 1220 as program instructions 1225 and data storage 1235, respectively. In other implementations, program instructions and/or data may be received, sent or stored upon different types of computer-accessible media, such as non-transitory media, or on similar media separate from the non-transitory computer-readable storage medium 1220 or the control system 1200. Generally speaking, a non-transitory, computer-readable storage medium may include storage media or memory media such as magnetic or optical media, e.g., disk or CD/DVD-ROM, coupled to the control system 1200 via the I/O interface 1230. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 1240.

In one implementation, the I/O interface 1230 may be configured to coordinate I/O traffic between the processors 1210A-1210N, the non-transitory computer-readable storage medium 1220, and any peripheral devices, including the network interface 1240 or other peripheral interfaces, such as input/output devices 1250. In some implementations, the I/O interface 1230 may perform any necessary protocol, timing or other data transformations to convert data signals from one component (e.g., non-transitory computer-readable storage medium 1220) into a format suitable for use by another component (e.g., processors 1210A-1210N). In some implementations, the I/O interface 1230 may include support for devices attached through various types of peripheral buses, such as a variant of the Peripheral Component Interconnect (PCI) bus standard or the Universal Serial Bus (USB) standard, for example. In some implementations, the function of the I/O interface 1230 may be split into two or more separate components, such as a north bridge and a south bridge, for example. Also, in some implementations, some or all of the functionality of the I/O interface 1230, such as an interface to the non-transitory computer-readable storage medium 1220, may be incorporated directly into the processors 1210A-1210N.

The network interface 1240 may be configured to allow data to be exchanged between the control system 1200 and other devices attached to a network, such as other control systems, computer systems, robotic arms, manipulators, or systems, proximity sensors and systems, imaging sensors and systems, wrapping systems, labeling systems, robotic or mobile drive units and systems, conveyors, other material handling systems or equipment, or between nodes of the control system 1200. In various implementations, the network interface 1240 may support communication via wired or wireless general data networks, such as any suitable type of Ethernet network.

Input/output devices 1250 may, in some implementations, include one or more displays, projection devices, audio input/output devices, keyboards, keypads, touchpads, scanning devices, imaging devices, sensors, photo eyes, proximity sensors, RFID readers, voice or optical recognition devices, or any other devices suitable for entering or retrieving data by one or more control systems 1200. Multiple input/output devices 1250 may be present in the control system 1200 or may be distributed on various nodes of the control system 1200. In some implementations, similar input/output devices may be separate from the control system 1200 and may interact with one or more nodes of the control system 1200 through a wired or wireless connection, such as over the network interface 1240.

As shown in FIG. 12, the memory 1220 may include program instructions 1225 that may be configured to implement one or more of the described implementations and/or provide data storage 1235, which may comprise various tables, data stores and/or other data structures accessible by the program instructions 1225. The program instructions 1225 may include various executable instructions, programs, or applications to facilitate palletizing operations and processes described herein, such as robotic arm, manipulator, or apparatus controllers, drivers, or applications, end of arm tool controllers, drivers, or applications, motor or actuator controllers, drivers, or applications, sensor controllers, drivers, or applications, sensor data processing applications, imaging data processing applications, etc. The data storage 1235 may include various data stores for maintaining data related to systems, operations, or processes described herein, such as robotic arms, manipulators, or apparatus, end of arm tools, actuators, motors, sensors, sensor data, pallets, totes, bins, cases, containers, and/or other objects, conveyors and other material handling equipment or apparatus, upstream systems, stations, or processes, downstream systems, stations, or processes, etc.

Those skilled in the art will appreciate that the control system 1200 is merely illustrative and is not intended to limit the scope of implementations. In particular, the control system and devices may include any combination of hardware or software that can perform the indicated functions, including computers, network devices, internet appliances, robotic devices, etc. The control system 1200 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will appreciate that, in some implementations, the functionality provided by the methods, systems, and apparatus discussed above may be provided in alternative ways, such as being split among more software modules or routines or consolidated into fewer modules or routines, and/or being split into additional or fewer robotic or automated units. Similarly, in some implementations, illustrated methods and systems may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. The various methods, apparatus, and systems as illustrated in the figures and described herein represent example implementations. The methods and systems may be implemented in software, hardware, or a combination thereof in other implementations. Similarly, the order of any method may be changed and various features may be added, reordered, combined, omitted, modified, etc., in other implementations.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and nodes may he implemented in firmware or hardware.

Unless otherwise explicitly stated, articles such as "a" or "an" should generally he interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and/or within less than 0.01% of the stated amount.

As used throughout this application, the word "may" is used in a permissive sense (i.e., meaning having the potential to), rather than the mandatory sense (i.e., meaning must) Similarly, the words "include," "including," and "includes" mean including, but not limited to. Additionally, as used herein, the term "coupled" may refer to two or more components connected together, whether that connection is permanent (e.g., welded) or temporary (e.g., bolted), direct or indirect (e.g., through an intermediary), mechanical, chemical, optical, or electrical.

From the foregoing, it will be appreciated that, although specific implementations have been described herein for purposes of illustration, various modifications may be made without deviating from the spirit and scope of the appended claims and the features recited therein. In addition, while certain aspects are presented below in certain claim forms, the inventors contemplate the various aspects in any available claim form. For example, while only some aspects may currently be recited as being embodied in a non-transitory computer-readable storage medium, other aspects may likewise he so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. An end of arm tool for a robotic arm, comprising:
   a mounting plate configured to couple to a robotic arm;
   a first pair of static forks coupled to the mounting plate, the first pair of static forks configured to lift pallets;
   a second pair of movable forks coupled to the mounting plate via pivotable joints; and
   a pair of actuators, respective actuators coupled to respective forks of the second pair of movable forks, the respective actuators configured to rotate respective forks of the second pair of movable forks between a storage position and a lifting position;
   wherein the second pair of movable forks is configured to lift pallets in the lifting position.

2. The end of arm tool of claim 1, wherein:
   respective forks of the second pair of movable forks are located outboard of the first pair of static forks in the storage position; and
   respective forks of the second pair of movable forks are located below the first pair of static forks in the lifting position.

3. The end of arm tool of claim 1, wherein the respective actuators are configured to rotate respective forks of the second pair of movable forks around the pivotable joints.

4. The end of arm tool of claim 1, wherein the pair of actuators comprise at least one of pneumatic actuators or hydraulic actuators.

5. An apparatus, comprising:
   a mounting plate;
   a pair of static forks coupled to the mounting plate, the pair of static forks configured to lift an object; and
   a pair of movable forks movably coupled to the mounting plate, respective forks of the pair of movable forks configured to move between a storage position and a lifting position;
   wherein respective forks of the pair of movable forks are rotatably coupled to the mounting plate via respective pivotable joints;
   wherein respective forks of the pair of movable forks rotate relative to the pair of static forks between the storage position and the lifting position; and
   wherein the pair of movable forks is configured to lift an object in the lifting position.

6. The apparatus of claim 5,
   wherein respective forks of the pair of movable forks rotate outboard of the pair of static forks in the storage position; and
   wherein respective forks of the pair of movable forks rotate below the pair of static forks in the lifting position.

7. The apparatus of claim 6, wherein respective forks of the pair of movable forks in the storage position are positioned substantially within a same plane as the pair of static forks.

8. The apparatus of claim 5, further comprising:
   an actuator configured to move respective forks of the pair of movable forks between the storage position and the lifting position.

9. The apparatus of claim 8, wherein the actuator comprises a sensing element configured to detect an actuated position of the actuator that corresponds to at least one of the storage position or the lifting position of the pair of movable forks.

10. The apparatus of claim 8, wherein the actuator comprises a plurality of actuators, respective actuators associated with and configured to move respective forks of the pair of movable forks.

11. The apparatus of claim 5, further comprising:
a control system configured to at least one of:
instruct movement of respective forks of the pair of movable forks between the storage position and the lifting position, or
instruct movement of a robotic arm to which the apparatus is coupled via the mounting plate.

12. The apparatus of claim 11, further comprising:
a first sensor associated with the pair of static forks and configured to detect presence or absence of an object lifted by the pair of static forks; and
a second sensor associated with the pair of movable forks and configured to detect presence or absence of an object lifted by the pair of movable forks in the lifting position;
wherein based at least in part on data received from at least one of the first sensor or the second sensor, the control system is configured to at least one of:
instruct movement of respective forks of the pair of movable forks, or
instruct movement of the robotic arm.

13. The apparatus of claim 12, wherein the first sensor and the second sensor comprise at least one of photoelectric sensors or proximity sensors.

14. The apparatus of claim 11, further comprising:
a plurality of sensors associated with the mounting plate and configured to detect presence or absence of a plurality of objects lifted by the pair of static forks;
wherein based at least in part on data received from at least one of the plurality of sensors, the control system is configured to:
instruct movement of the robotic arm.

15. The apparatus of claim 14, wherein the plurality of sensors comprise at least one of photoelectric sensors, proximity sensors, imaging sensors, barcode scanners, or RFID readers.

16. The apparatus of claim 5, wherein the pair of static forks is configured to lift a first object and the pair of movable forks is configured to lift a second object concurrently.

17. A method, comprising:
instructing, by a control system, movement of a pair of movable forks of an apparatus from a storage position to a lifting position, the apparatus including a pair of static forks and the pair of movable forks coupled to a mounting plate, wherein respective forks of the pair of movable forks are rotatably coupled to the mounting plate via respective pivotable joints; and
instructing, by the control system, movement of the apparatus to lift a first object via the pair of static forks from a loading position and to lift a second object via the pair of movable forks in the lifting position from a staging position.

18. The method of claim 17, further comprising:
instructing, by the control system, movement of the apparatus to place the second object lifted via the pair of movable forks at the loading position; and
instructing, by the control system, movement of the pair of movable forks from the lifting position to the storage position.

19. The method of 18, further comprising:
instructing, by the control system, movement of the apparatus to place the first object lifted via the pair of static forks at a downstream station.

20. The method of 19, further comprising:
instructing, by the control system, movement of the apparatus to lift a third object via the pair of static forks from a replenishment position; and
instructing, by the control system, movement of the apparatus to place the third object lifted via the pair of static forks at the staging position.

* * * * *